(12) United States Patent
Sugita et al.

(10) Patent No.: US 7,421,217 B2
(45) Date of Patent: Sep. 2, 2008

(54) IMAGE FORMING APPARATUS, IMAGE FORMING METHOD, TONER COUNTER AND CALCULATION METHOD OF TONER CONSUMPTION

(75) Inventors: Takatoshi Sugita, Nagano-ken (JP); Isao Inaba, Nagano-ken (JP); Hidenori Kin, Nagano-ken (JP); Toshiki Shiroki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 270 days.

(21) Appl. No.: 11/354,277

(22) Filed: Feb. 14, 2006

(65) Prior Publication Data

US 2006/0233559 A1 Oct. 19, 2006

(30) Foreign Application Priority Data

| Feb. 16, 2005 | (JP) | ............................. 2005-038671 |
| Oct. 21, 2005 | (JP) | ............................. 2005-307539 |
| Oct. 21, 2005 | (JP) | ............................. 2005-307541 |
| Oct. 21, 2005 | (JP) | ............................. 2005-307542 |

(51) Int. Cl.
G03G 15/08 (2006.01)
G03G 15/00 (2006.01)

(52) U.S. Cl. ............................. 399/27; 399/49; 399/72

(58) Field of Classification Search .................. 399/27, 399/49, 60, 72

See application file for complete search history.

(56) References Cited

U.S. PATENT DOCUMENTS

| 6,061,144 A * | 5/2000 | Mamizuka ................... 358/1.9 |
| 6,934,481 B2 * | 8/2005 | Hama .......................... 399/49 |
| 2004/0081476 A1 | 4/2004 | Hama |

FOREIGN PATENT DOCUMENTS

| JP | 2002-162800 | 6/2002 |
| JP | 2004-077873 | 3/2004 |

* cited by examiner

*Primary Examiner*—Hoang Ngo
(74) *Attorney, Agent, or Firm*—Hogan & Hartson LLP

(57) ABSTRACT

An image forming apparatus of forming an image corresponding to image data is formed on a recording medium comprises a data processor which performs data processing of input image data so that a first correlation will be established between a target image density expressed by the input image data and the actual image density of an image formed on the recording medium, thereby generating output image data, an image forming unit which forms an image corresponding to the output image data on the recording medium, and a toner consumption amount calculator which calculates a toner consumption amount which is consumed for image formation based on the input image data and based on a second correlation between the input image data and an adhering toner amount on the recording medium.

19 Claims, 27 Drawing Sheets

F I G. 6
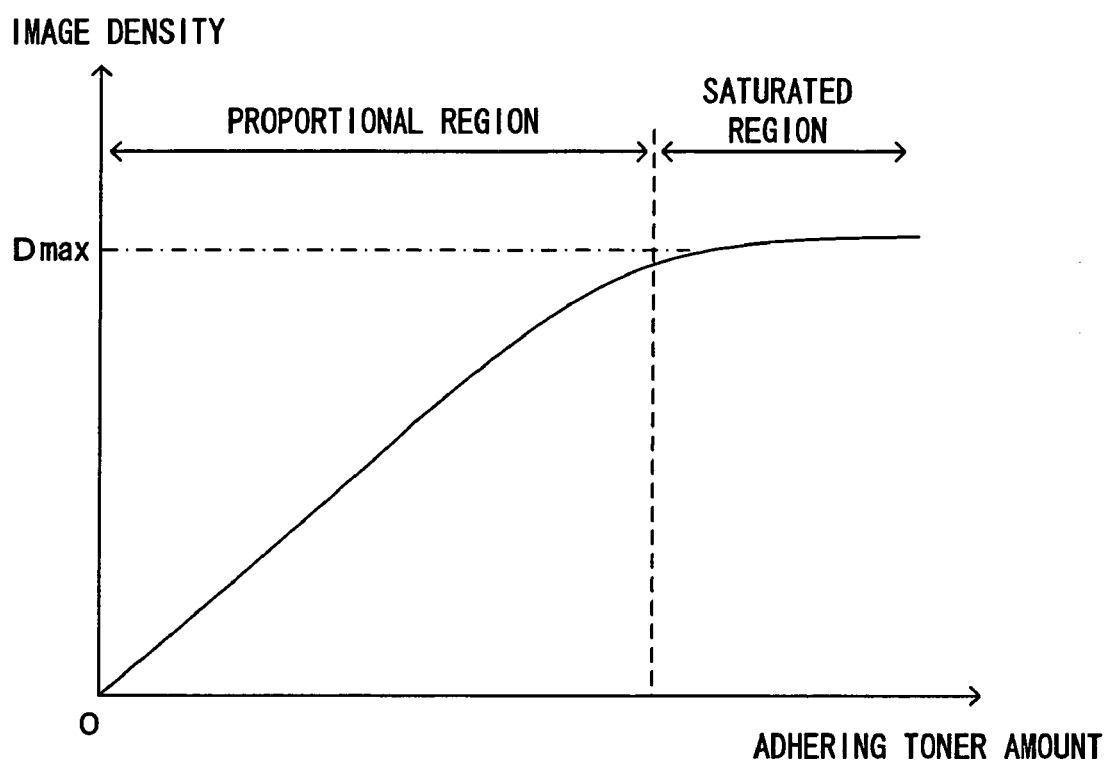

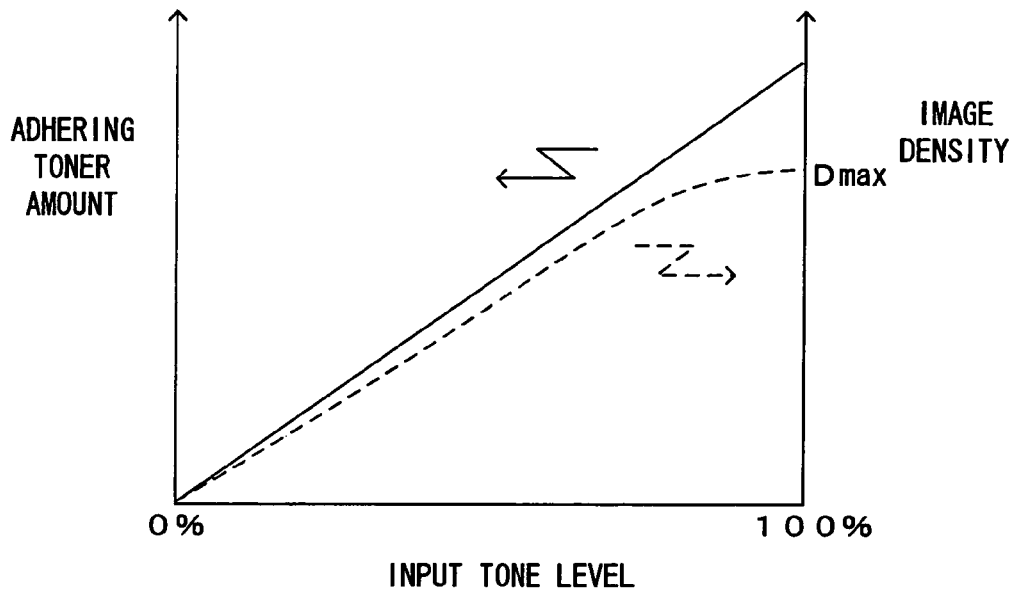
FIG. 7A: NO DATA PROCESSING PERFORMED
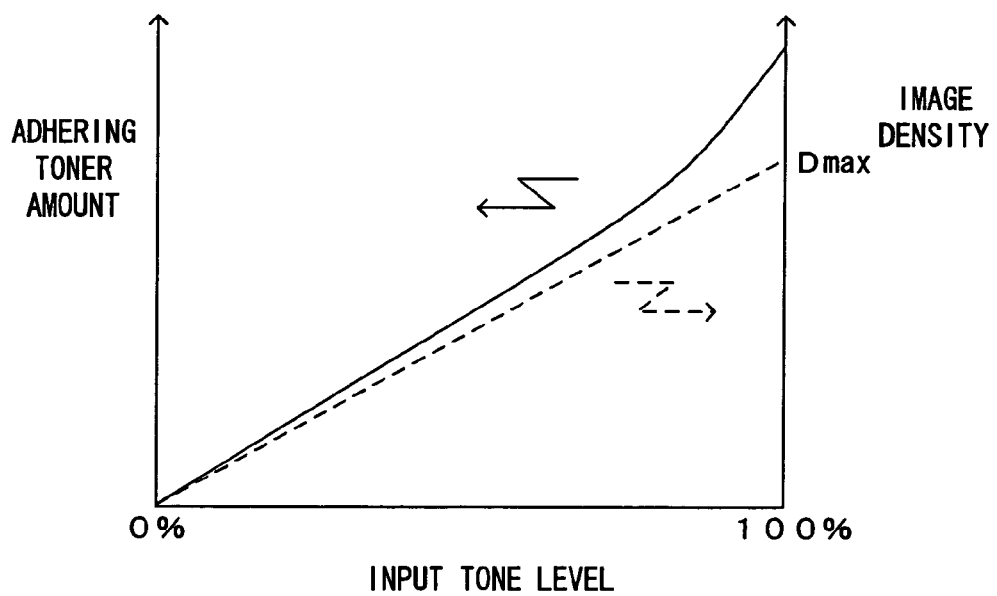
FIG. 7B: DATA PROCESSING PERFORMED FIG. 8A : TONE CHARACTERISTIC
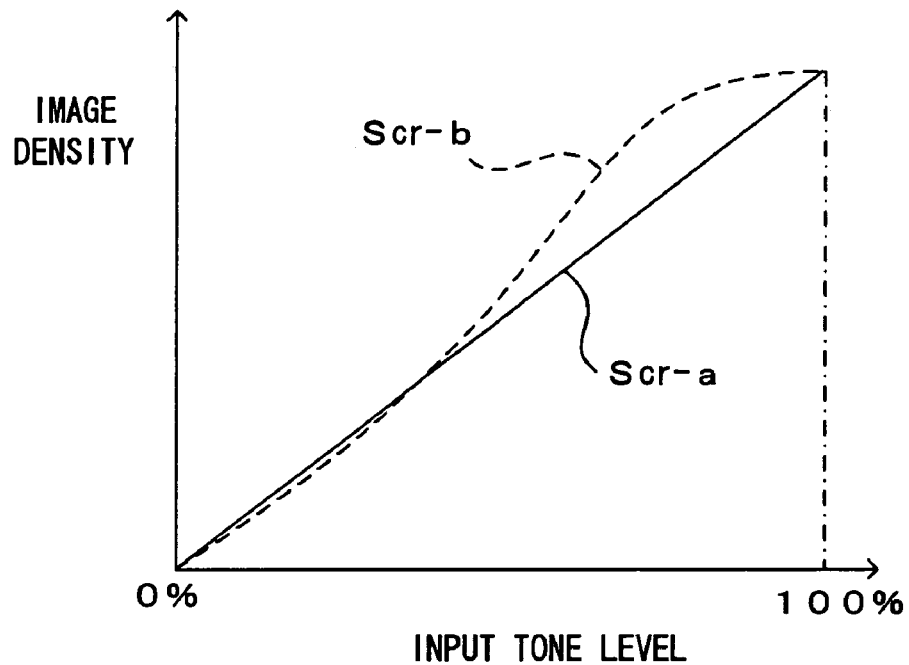
FIG. 8B : ADHERING TONER AMOUNT
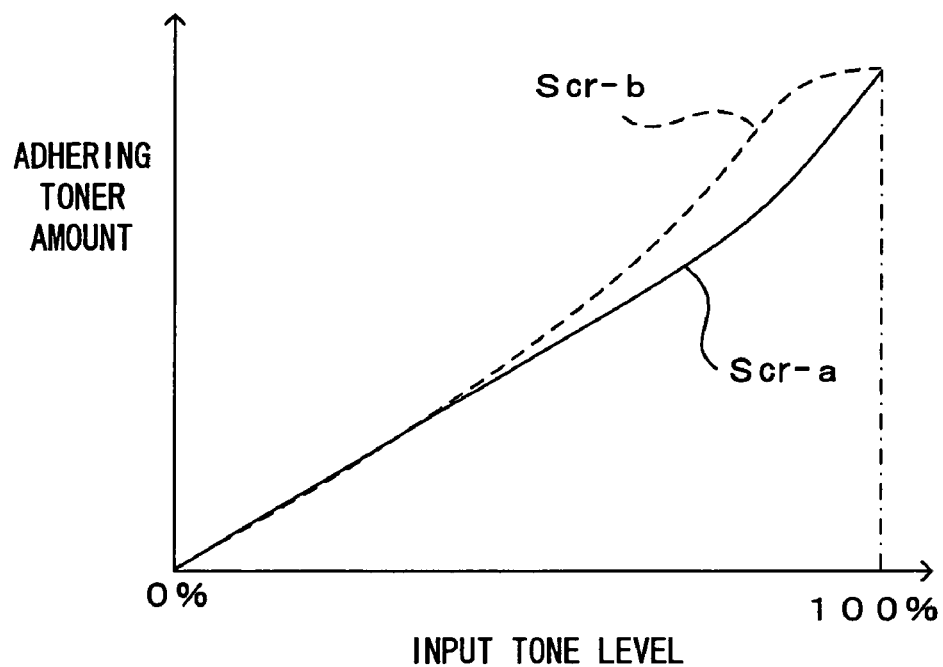

FIG. 11

| | | L1 | |
|---|---|---|---|
| | | Scr-a | Scr-b |
| TONER COLOR | CYAN | 248 | 212 |
| | MAGENTA | 218 | 213 |
| | YELLOW | 255 | 218 |
| | BLACK | 255 | 210 |

FIG. 17
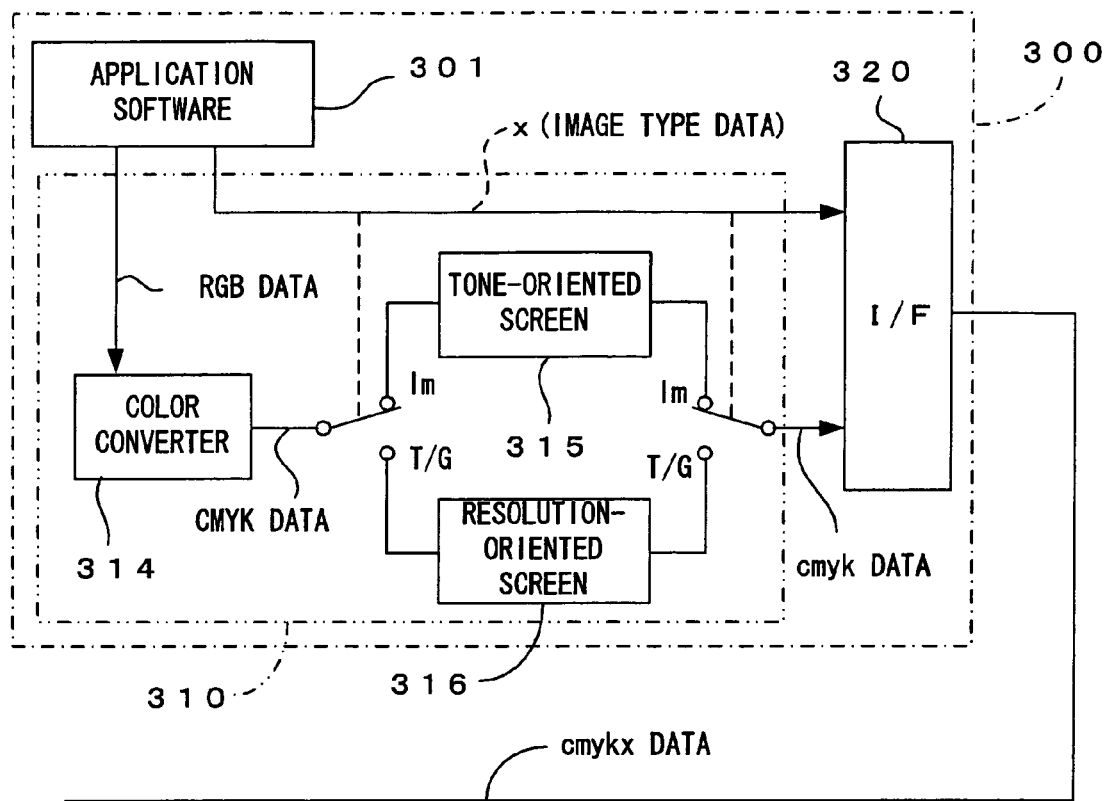
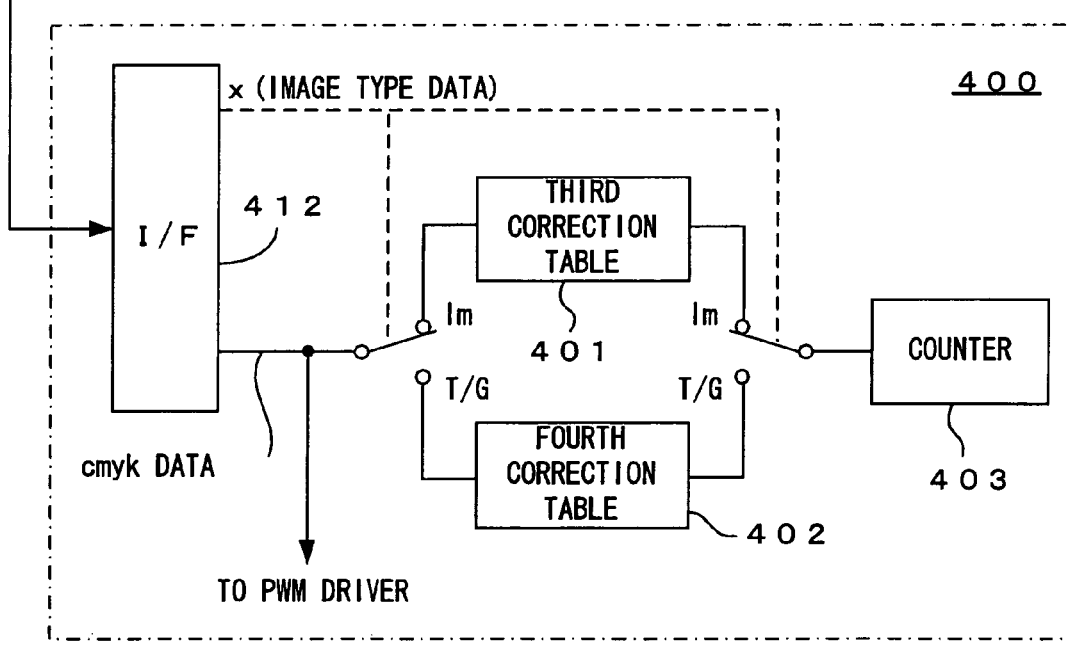

IMAGE FORMING APPARATUS, IMAGE FORMING METHOD, TONER COUNTER AND CALCULATION METHOD OF TONER CONSUMPTION

CROSS REFERENCE TO RELATED APPLICATION

The disclosure of Japanese Patent Applications enumerated below including specifications, drawings and claims is incorporated herein by reference in its entirety:

No. 2005-038671 filed on Feb. 16, 2005;
No. 2005-307539 filed on Oct. 21, 2005;
No. 2005-307541 filed on Oct. 21, 2005; and
No. 2005-307542 filed on Oct. 21, 2005.

BACKGROUND

1. Technical Field

The present invention relates to a technique for calculating a toner consumption amount which is demanded for image formation in an image forming apparatus which forms an image using toner.

2. Related Art

Among image forming apparatuses which form images using toner is such an apparatus in which, in an attempt to obtain a good image quality, processes multi-level tone data and forms an image based on the processed image data. For instance, in the image forming apparatus which is described in Japanese Unexamined Patent Application Publication No. 2004-077873, the gamma characteristic of the apparatus is presumed from the detected densities of patch images which gradually span different tone levels, a characteristic which will cancel the gamma characteristic is given to image data, and an image of an excellent quality is formed without any influence exerted by a change of the gamma characteristic.

Meanwhile, for the purpose of grasping a remaining toner amount in the apparatus and properly managing consumables, an image forming apparatus of this type must be able to accurately calculate the amount of toner which is consumed to form an image. To this end, tone levels at print dots are integrated and a toner consumption amount is calculated based on this integrated value according to the technique described in Japanese Unexamined Patent Application Publication No. 2002-162800 for instance.

However, a tone level expressed by image data is not necessarily in proportion to an actual toner consumption amount. For example, an apparatus of this type generally performs data processing which will provide image data with a predetermined characteristic in order to improve an image quality. This maintains the image data and the density of an image eventually formed on a recording medium in a constant correlation. This data processing nevertheless does not always manage the correlation between the image data and the amount of toner constituting the image which has been formed. Further, it is known that the density of toner constituting an image and the density of the image hold a non-linear relationship with each other. These factors give rise to significant non-linearity between a tone level expressed by image data and a toner consumption amount, which could deteriorate the accuracy of calculating the toner consumption amount.

SUMMARY

An advantage of the present invention is to permit forming an image in an excellent quality using toner and accurately calculating the amount of toner which is consumed to form an image.

One aspect of the invention is related to an image forming apparatus in which input image data are processed such that it will be possible to establish a predetermined first correlation between a target image density expressed by the input image data and the actual image density of an image formed on a recording medium, output image data are accordingly generated and an image corresponding to the output image data is formed on the recording medium. The amount of toner which is consumed for image formation is calculated based on the input image data and based on a predetermined second correlation between the input image data and an adhering toner amount on the recording medium.

A different aspect of the invention is related to an image forming apparatus which receives from an external apparatus an image formation command which contains operation-related information, which is for determining the mode of an image forming operation to execute, and pixel information, which is related to tone levels at pixels to be formed, performs the image forming operation in a mode which is suitable to the operation-related information and forms an image which corresponds to the pixel information. The tone levels are corrected in accordance with the operation-related information and integrated, and the amount of toner which is consumed to form an image is calculated based on the integrated value.

In other aspect of the invention, multi-level halftone input image data corresponding to toner colors are processed, thereby generating multi-level halftone output image data which are in a predetermined correlation with the input image data, an image corresponding to the output image data is formed with toner, and the amount of toner which is consumed to form an image is calculated based on the input image data. In the data processing above, based on a preliminarily identified relationship between a tone level and an image density for image formation, a tone level of the output image data is scaled so that this tone level will become equal to or lower than a multi-level saturation-initiating tone level at which an increase of an image density associated with a tone level increase starts saturating.

In another aspect of the invention, multi-level halftone input image data corresponding to a toner color are processed, thereby generating output image data, an image corresponding to the output image data is formed with toner, a tone level of the input image data is integrated, and the amount of toner which is consumed to form an image is calculated based on the integrated value. The data processing characteristic of the data processing above is set so as to uniquely determine a toner consumption amount demanded by an image which is formed based on the output image data corresponding to the input image data, in response to the tone level of the input image data.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 6 is a drawing which shows the relationship between an adhering toner amount and an image density;

FIGS. 7A and 7B are drawings which show the relationship between an input tone level, an adhering toner amount and an image density;

FIGS. 8A and 8B are drawings for describing the principles on a method of determining the second correlation;

FIG. 11 is a drawing which shows the boundary of a correction range;

FIG. 17 is a block diagram which illustrates the fourth embodiment of the image forming apparatus according to the invention;

DETAILED DESCRIPTION OF THE PREFERRED EMBODIMENTS

Figure 1:
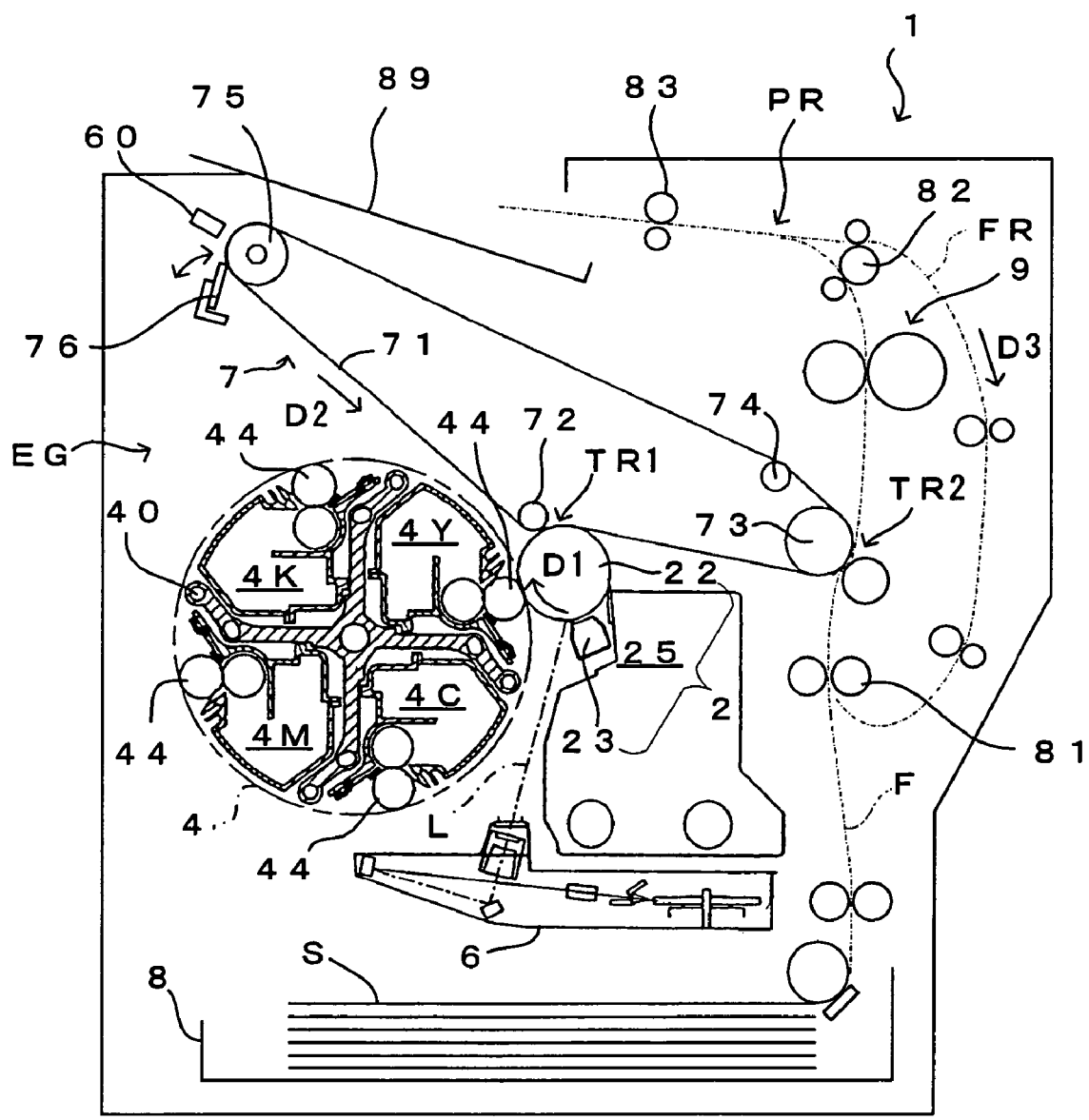
FIG. 1 is a drawing which shows an example of the structure of an image forming apparatus to which the invention is favorably applicable.
Figure 2:
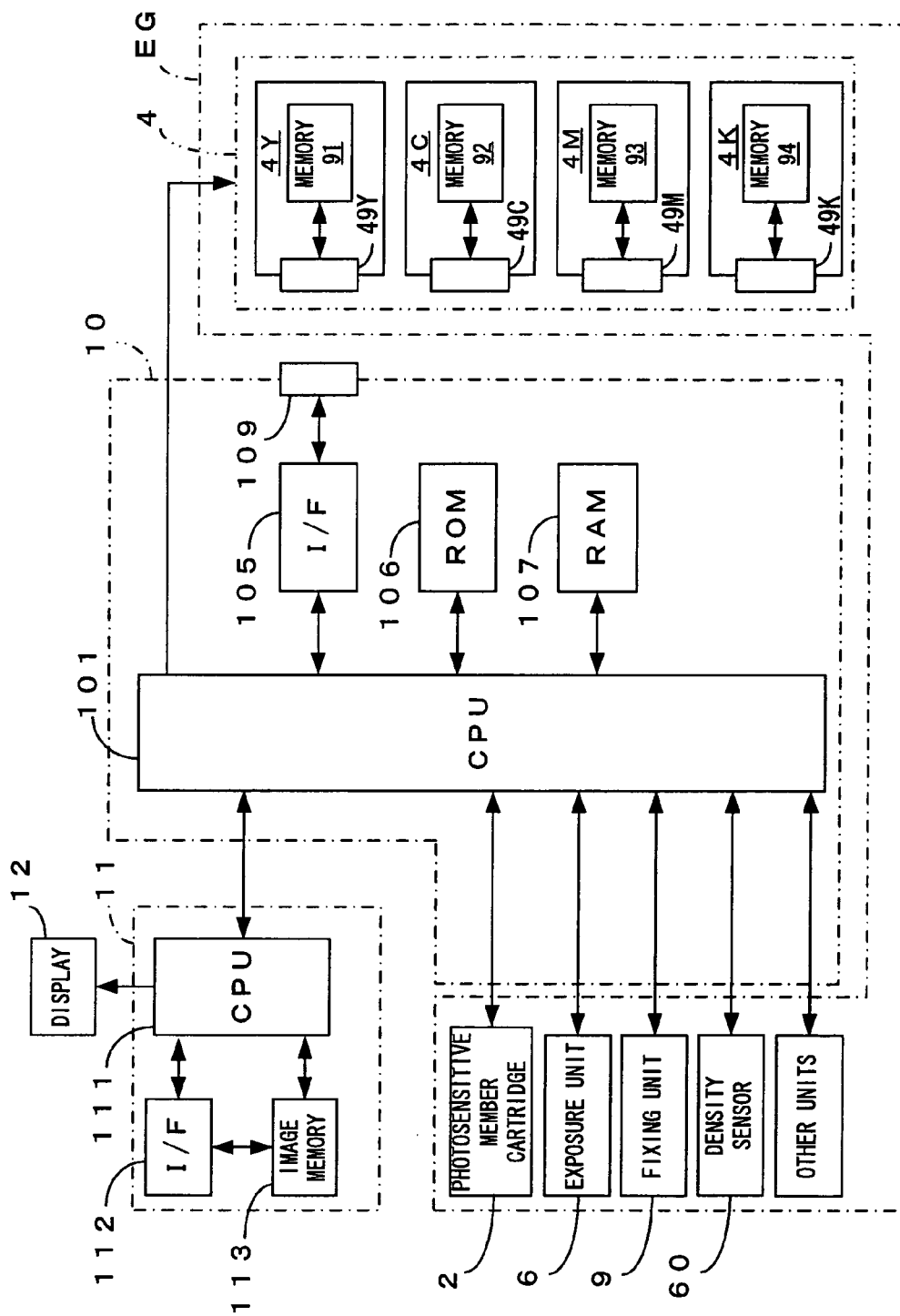
FIG. 2 is a block diagram of the electric structure of the image forming apparatus shown in FIG. 1.

FIG. 1 is a drawing which shows an example of the structure of an image forming apparatus to which the invention is favorably applicable. FIG. 2 is a block diagram of the electric structure of the image forming apparatus shown in FIG. 1. The illustrated apparatus 1 is an apparatus which overlays toner(developing agent) in four colors of yellow (Y), cyan (C), magenta (M) and black (K) one atop the other and accordingly forms a full-color image, or forms a monochrome image using only black toner (K). In the image forming apparatus 1, when an image signal is fed to a main controller 11 from an external apparatus such as a host computer, an engine controller 10 performs a predetermined image forming operation in accordance with an instruction received from the main controller 11. The engine controller 10 controls respective portions of an engine part EG, and an image which corresponds to the image signal is formed on a sheet S.

In the engine part EG, a photosensitive member 22 is disposed so that the photosensitive member 22 can freely rotate in the arrow direction D1 shown in FIG. 1. Around the photosensitive member 22, a charger unit 23, a rotary developer unit 4 and a cleaner 25 are disposed in the rotation direction D1. A predetermined charging bias is applied upon the charger unit 23, whereby an outer circumferential surface of the photosensitive member 22 is charged uniformly to a predetermined surface potential. The cleaner 25 removes toner which remains adhering to the surface of the photosensitive member 22 after primary transfer, and collects the toner into a used toner tank which is disposed inside the cleaner 25. The photosensitive member 22, the charger unit 23 and the cleaner 25, integrated as one, form a photosensitive member cartridge 2. The photosensitive member cartridge 2 can be freely attached to and detached from a main section of the apparatus 1 as one integrated unit.

An exposure unit 6 emits a light beam L toward the outer circumferential surface of the photosensitive member 22 which is thus charged by the charger unit 23. The exposure unit 6 makes the light beam L expose on the photosensitive member 22 in accordance with an image signal fed from the external apparatus and forms an electrostatic latent image which corresponds to the image signal.

The developer unit 4 develops thus formed electrostatic latent image with toner. The developer unit 4 comprises a support frame 40 which is disposed for free rotations about a rotation shaft which is perpendicular to the plane of FIG. 1, and also comprises a yellow developer 4Y, a cyan developer 4C, a magenta developer 4M and a black developer 4K which house toner of the respective colors and are formed as cartridges which are freely attachable to and detachable from the support frame 40. The engine controller 10 controls the developer unit 4. The developer unit 4 is driven into rotations based on a control instruction from the engine controller 10. When the developers 4Y, 4C, 4M and 4K are selectively positioned at a predetermined developing position which abuts on the photosensitive member 22 or is away a predetermined gap from the photosensitive member 22, toner of the color corresponding to the selected developer is supplied onto the surface of the photosensitive member 22 from a developer roller 44 disposed to the selected developer which carries toner of this color and has been applied with the predetermined developing bias. As a result, the electrostatic latent image on the photosensitive member 22 is visualized in the selected toner color.

Non-volatile memories 91 through 94 which store information regarding the respective developers are disposed to the developers 4Y, 4C, 4M and 4K. As one of connectors 49Y, 49C, 49M and 49K disposed to the respective developers selected as needed is connected with a connector 109 which is disposed to the main section, a CPU 101 of the engine controller 10 and one of the memories 91 through 94 communicate with each other. In this manner, the information regarding the respective developers is transmitted to the CPU 101 and the information inside the respective memories 91 through 94 is updated and stored. The communication between the CPU 101 and the memories 91 through 94 is not limited in the mechanical contacting manner described above, and may be carried out in a non-contacting manner such as a radio communication for example.

A toner image developed by the developer unit 4 in the manner above is primarily transferred onto an intermediate transfer belt 71 of a transfer unit 7 in a primary transfer region TRI. The transfer unit 7 comprises the intermediate transfer belt 71 which runs across a plurality of rollers 72 through, 75, and a driver (not shown) which drives a roller 73 into rotations to thereby rotate the intermediate transfer belt 71 along a predetermined rotation direction D2. For transfer of a color image on the sheet S, toner images in the respective colors on the photosensitive member 22 are superposed one atop the other on the intermediate transfer belt 71, thereby forming a color image. Further, on the sheet S unloaded from a cassette 8 one at a time and transported to a secondary transfer region TR2 along a transportation path F, the color image is secondarily transferred.

At this stage, for the purpose of correctly transferring the image held by the intermediate transfer belt 71 onto the sheet S at a predetermined position, the timing of feeding the sheet S into the secondary transfer region TR2 is managed. To be more specific, there is a gate roller 81 disposed in front of the secondary transfer region TR2 on the transportation path F. As the gate roller 81 rotates in synchronization to the timing of rotations of the intermediate transfer belt 71, the sheet S is fed into the secondary transfer region TR2 at predetermined timing.

Further, the sheet S now bearing the color image is transported to a discharge tray 89, which is disposed to a top surface of the main section of the apparatus, through a fixing unit 9, a pre-discharge roller 82 and a discharge roller 83. Meanwhile, when images are to be formed on the both surfaces of the sheet S, the discharge roller 83 starts rotating in the reverse direction upon arrival of the trailing end of the sheet S, which carries the image on its one surface as described above, at a reversing position PR located behind the pre-discharge roller 82, thereby transporting the sheet S in the arrow direction D3 along a reverse transportation path FR. While the sheet S is returned back to the transportation path F again before arriving at the gate roller 81, the surface of the sheet S which abuts on the intermediate transfer belt 71 in the secondary transfer region TR2 and is to receive a transferred image is at this stage opposite to the surface which already bears the image. In this fashion, it is possible to form images on the both surfaces of the sheet S.

Further, there are a density sensor 60 and a cleaner 76 in the vicinity of the roller 75. The density sensor 60 optically detects a toner amount which constitutes a toner image which is formed as a patch image on the intermediate transfer belt 71 when needed. That is, the density sensor 60 irradiates light toward the patch image, receives reflection light from the patch image, and outputs a signal corresponding to a reflection light amount. The cleaner 76 can be attached to and detached from the intermediate transfer belt 71. When abutting on the intermediate transfer belt 71 as needed, the cleaner 76 scrapes off the toner remaining on the intermediate transfer belt 71.

Further, as shown in FIG. 2, the apparatus 1 comprises a display 12 which is controlled by a CPU 111 of the main controller 11. The display 12 is formed by a liquid crystal display for instance, and shows predetermined messages which are indicative of operation guidance for a user, a progress in the image forming operation, abnormality in the apparatus, the timing of exchanging any one of the units, etc.

In FIG. 2, denoted at 113 is an image memory which is disposed to the main controller 11, so as to store an image which is fed from an external apparatus such as a host computer via an interface 112. Denoted at 106 is a ROM which stores a calculation program executed by the CPU 101, control data for control of the engine part EG, etc. Denoted at 107 is a memory (RAM) which temporarily stores a calculation result derived by the CPU 101, other data, etc.

Figure 3:
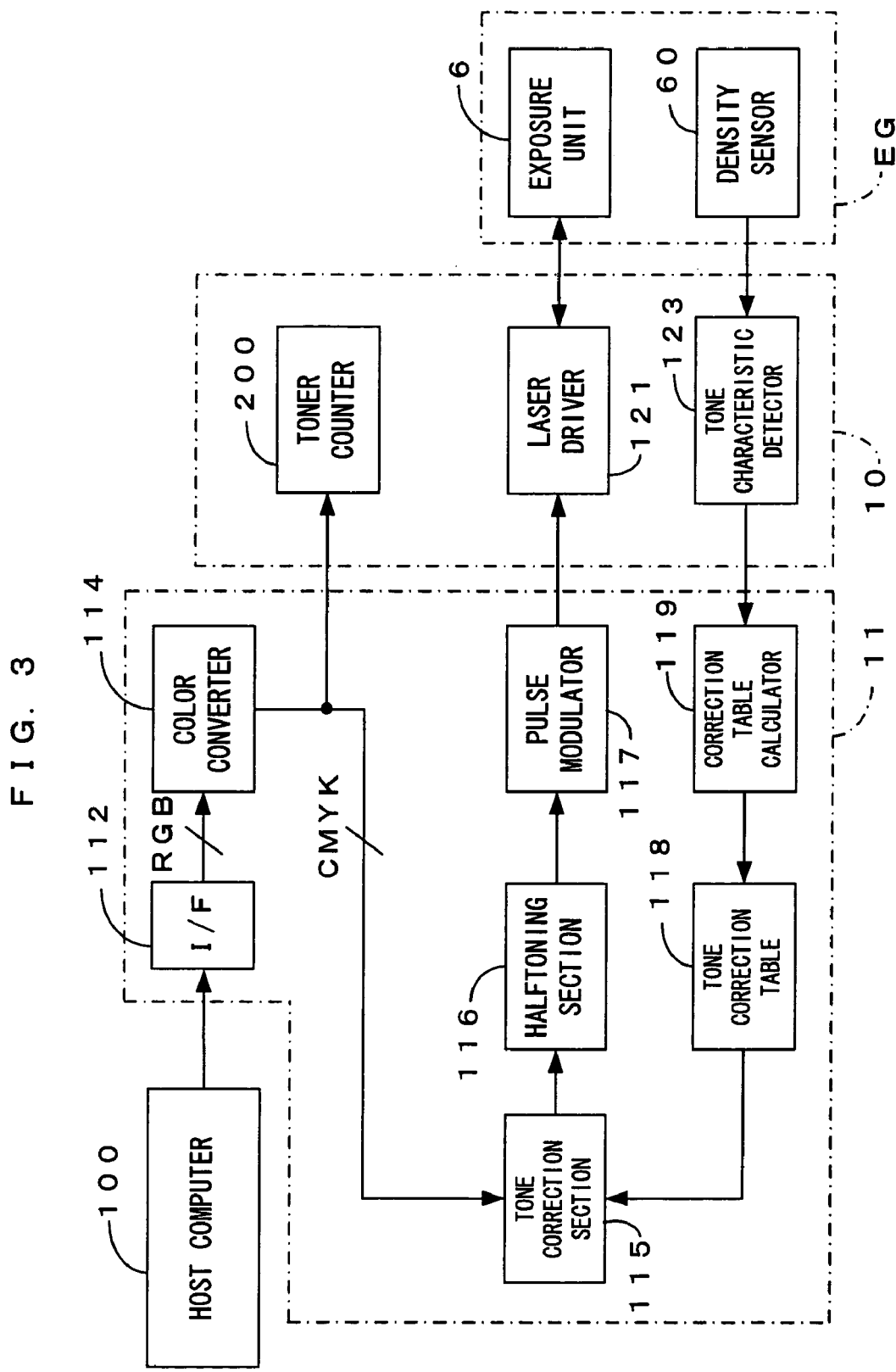
FIG. 3 is a diagram which shows signal processing blocks of the apparatus.

FIG. 3 is a diagram which shows signal processing blocks of the apparatus. In the image forming apparatus, when an image signal is inputted from an external apparatus such as a host computer 100, the main controller 11 performs a predetermined signal processing on the input image signal. The main controller 11 includes function blocks such as a color converter 114, a tone correction section 115, a half-toning section 116, a pulse modulator 117, a tone correction table 118, a tone-correction-table operation section 119.

In addition to the CPU 101, the ROM 106, and the RAM 107 shown in FIG. 2, the engine controller 10 further includes a laser driver 121 for driving a laser light source provided at the exposure unit 6, and a tone characteristic detector 123 for detecting a tone characteristic based on a detection result given by the density sensor 60, the tone characteristic representing a gamma characteristic of the engine EG.

In the main controller 11 and the engine controller 10, the function blocks may be implemented in hardware or otherwise, in software executed by the CPU 111, 101.

In the main controller 11 supplied with the image signal from the host computer 100, the color converter 114 converts RGB color data into CMYK color data, the RGB color data representing tone levels of RGB components of each pixel in an image corresponding to the image signal, the CMYK color data representing tone levels of CMYK components corresponding to the RGB components. In the color converter 114, the input RGB color data comprise 8 bits per color component for each pixel (representing 256 tone levels), for example, whereas the output CMYK color data similarly comprise 8 bits per color component for each pixel (representing 256 tone levels). The CMYK tone data outputted from the color converter 114 are inputted to the tone correction section 115.

The tone correction section 115 performs tone correction on the per-pixel CMYK data inputted from the color converter 114. Specifically, the tone correction section 115 refers to the tone correction table 118 previously stored in the non-volatile memory, and converts the per-pixel CMYK data inputted from the color converter 114 into corrected CMYK data according to the tone correction table 118, the corrected CMYK data representing corrected tone levels. An object of the tone correction is to compensate for the variations of the gamma characteristic of the engine EG constructed as described above, thereby allowing the image forming apparatus to maintain the overall gamma characteristic thereof in an idealistic state at all times.

The corrected CMYK tone data thus obtained are inputted to the half-toning section 116. The half-toning section 116 performs a half-toning process, such as an error diffusion process, a dithering process or a screening process, and then supplies the pulse modulator 117 with the half-toned CMYK tone data comprising 8 bits per color component for each pixel. The content of the half-toning process varies depending upon the type of an image to be formed. That is, a process of the most suited content for the image is selected based on judgment standards according to which the subject image is classified as any one of a monochromatic image, a color image, a line drawing and a graphic image. Then, the selected process is executed.

The half-toned CMYK tone data inputted to the pulse modulator 117 are represented by a multivalued signal which indicates respective sizes and arrays of CMYK toner dots, to which CMYK color toners are made to adhere and which constitute one pixel. Based on such half-toned CMYK tone data thus received, the pulse modulator 117 generates a video signal for pulse width modulation of an exposure laser pulse for forming each of CMYK color images, the exposure laser provided at the engine EG. Then, the resultant signal is outputted to the engine controller 10 via a video interface not shown. In response to the video signal, the laser driver 121 provides ON/OFF control of a semiconductor laser of the exposure unit 6 whereby an electrostatic latent image of each of the color components is formed on the photosensitive member 22. The image corresponding to the image signal is formed in this manner.

In the image forming apparatuses of this type, the gamma characteristic varies from apparatus to apparatus. Furthermore, the apparatus per se encounters the variations of the gamma characteristic thereof according to the use conditions thereof. In order to eliminate the influences of the varied gamma characteristics on the image quality, a tone control process is performed in a predetermined timing so as to update the contents of the tone correction table 118 based on measurement results of image density.

The tone control process is performed as follows. Toned patch images for tone correction, prepared for measurement of the gamma characteristic, are formed on the intermediate transfer belt 71 by means of the engine EG. A density of each of the toned patch images is detected by the density sensor 60. Based on signals from the density sensor 60, the tone characteristic detector 123 generates a tone characteristic (the gamma characteristic of the engine EG) which relate the individual tone levels of the toned patch images with the detected image densities. The resultant tone characteristic is outputted to the tone-correction table operation section 119 of the main controller 11. The tone-correction table operation section 119, in turn, operates tone correction table data based on the tone characteristic supplied from the tone characteristic detector 123. The tone correction table data are used for compensating for the measured tone characteristic of the engine EG in order to obtain an idealistic tone characteristic. Then, the tone-correction table operation section 119 updates the tone correction table 118 to the operation results. The tone correction table 118 is re-defined in this manner. Thus, the image forming apparatus is allowed to form images of a consistent quality regardless of the variations of the gamma characteristic thereof or the time-related variations thereof.

A description will now be given on the operation and the structure of a toner counter which calculates the amount of toner which is consumed to form an image in the image forming apparatus having above structure. As shown in FIG. 3, in this image forming apparatus, the engine controller 10 is equipped with a toner counter 200. The toner counter 200 calculates, as for each color, the amount of toner which is consumed for image formation, based on the multi-level tone data for each one of the C, M, Y and K colors fed to the tone correction part 115 from the color conversion part 114 inside the main controller 10.

Outline of First and Second Embodiments

The first and the second embodiments with respect to an image forming apparatus implementing the toner counting technique according to the invention will now be described. Although the toner counter is generally denoted at the reference symbol 200 in FIG. 3, for distinction from other embodiments, the toner counter according to the first and the second embodiments will be hereinafter generally denoted at the reference symbol 210.

Figure 4:
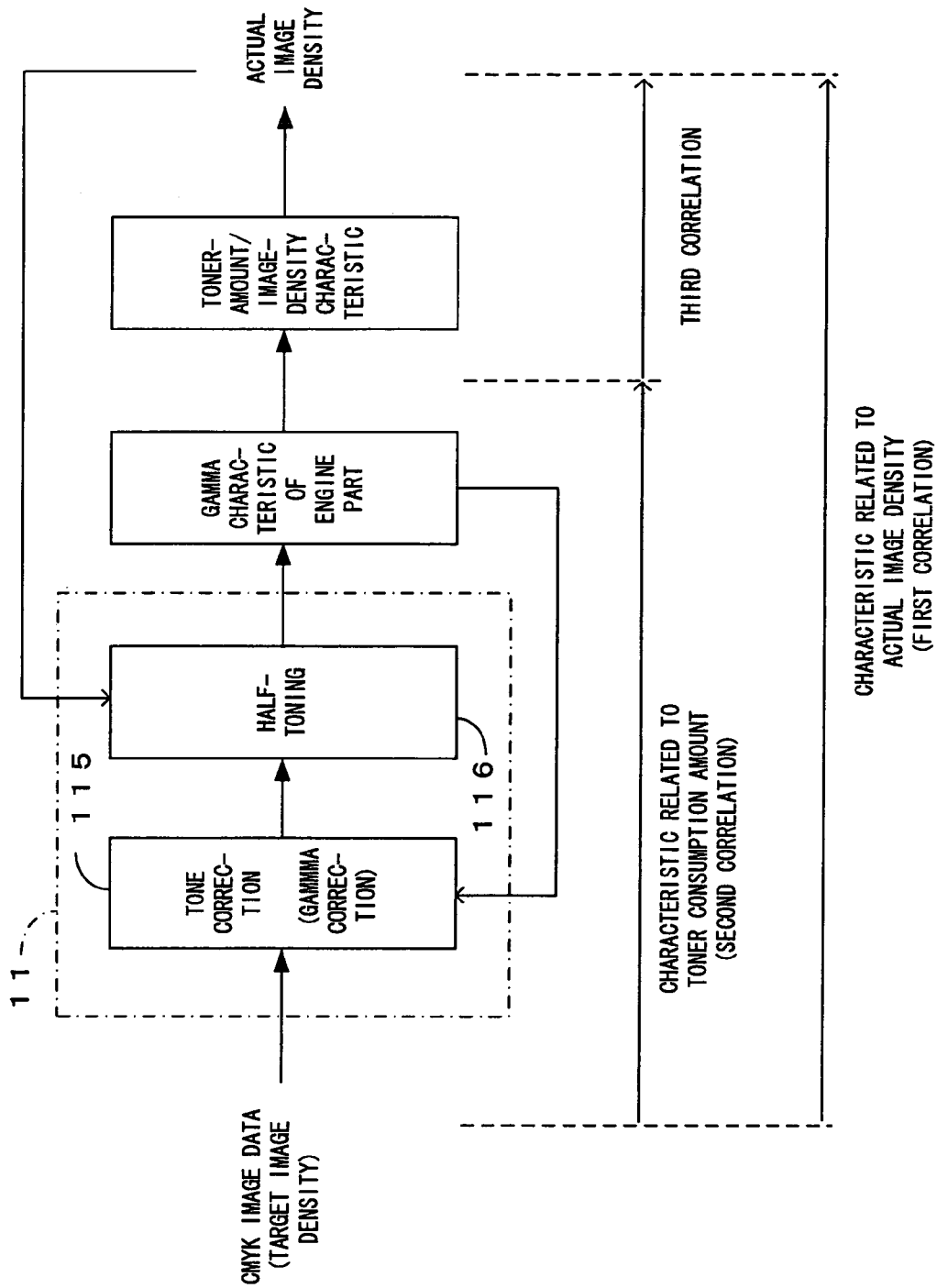
FIG. 4 is a drawing for describing the principles of the toner counting technique according to the first and the second embodiments.

FIG. 4 is a drawing for describing the principles of the toner counting technique according to the first and the second embodiments. CMYK tone data after color conversion express a target image density which an image which will be formed should have. Describing in more specific details, for each color, the CMYK tone data are indicative of a tone level which each print dot constituting the image should have. Meanwhile, data sent to the engine part EG are tone data as they are after treated by the tone correction section 115 and the halftoning section 116 through necessary data processing. The tone correction section 115 performs data processing which compensates the gamma characteristic of the engine part EG. In short, the data output from the tone correction section 115 exhibit a characteristic which corresponds to the reverse characteristic of the gamma characteristic against the input CMYK tone data. Meanwhile, the halftoning section 116 performs such data processing that an output image will exhibit a desired tone reproduction.

The density of an image formed by the engine part EG based on thus processed image data and transferred and fixed on a sheet (i.e., the actual image density) is under the influence of the gamma characteristic of the engine part EG and an adhering-toner-amount/image-density characteristic which will be described later. From the opposite point of view, realization of a stable image quality despite these characteristics is attributable to processing of image data output from the halftoning section 116 which cancels out the gamma characteristic of the engine part EG and the adhering-toner-amount/image-density characteristic and achieves a desired image density.

Figure 5:
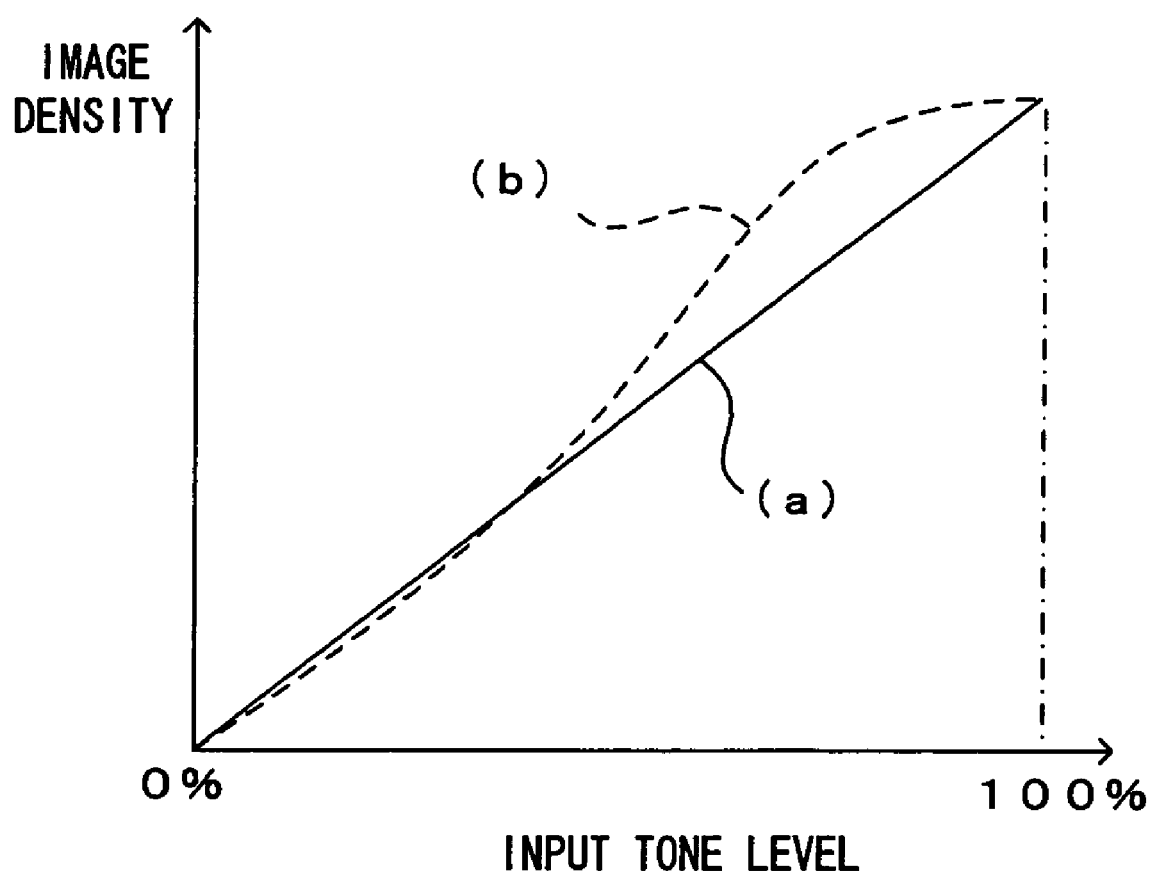
FIG. 5 is a drawing which shows an example of the relationship between an input tone level and an image density.

FIG. 5 is a drawing which shows an example of the relationship between an input tone level and an image density. Describing in more specific details, this is a drawing which shows the relationship between a tone level (input tone level) of the input CMYK tone data as they are after color conversion of the input image signal and the actual image density of an image which is formed based on this tone data. For instance, when there is a need for expressing a photo image with high fidelity, the input tone level and the actual image density may be in an approximately linear relationship with each other as denoted at the curve (a). In other instances like a need for expressing a photo image with an enhanced contour or forming an image which is mainly comprised of a text, the relationship as the one denoted at the curve (b) may be provided for a higher image contrast. Appropriately screening image data, the halftoning part 116 secures that the correlation between an input tone level and an actual image density realizes a desirable characteristic.

Hence, to the extent that the apparatus operates under a properly controlled condition, CMYK tone data which express a target density of an image to be formed and an actual image density finally attained on a sheet S maintain a constant correlation (first correlation) with each other. Meanwhile, as described below, the actual image density and the amount of toner constituting the image may be in a non-linear relationship (third correlation) with each other.

FIG. 6 is a drawing which shows the relationship between an adhering toner amount and an image density. The characteristic which an image density exhibits vis a vis an adhering toner amount will be hereinafter referred to as the "toner-amount/image-density characteristic". As shown in FIG. 6, although an image density increases generally in proportion to an increase of an adhering toner amount, as the adhering toner amount exceeds a certain level, the increase of the image density becomes sluggish and saturates in the end with almost no more changes. This is because when the surface of the sheet S is covered with toner, the image density in that area becomes almost equal to the hue of the toner, and even though the amount of toner further increases, the image density will not increase any more. As for the toner-amount/image-density characteristic (FIG. 6), a region in which the image density is approximately proportional to the adhering toner amount will be hereinafter referred to as the "proportional region" and a region in which the image density shows no great changes will be hereinafter referred to as the "saturated region".

An operating condition for the image forming apparatus of this type is preferably set such that the adhering toner amount will belong to the saturated region at a maximum tone level, e.g., such that the density of a solid image with 255 tone levels (100%) will be Dmax in FIG. 6. This prevents variations of the adhering toner amount from showing themselves as varied densities in a solid image or an image which is mainly comprised of a text. However, the adhering toner amount and the image density are not always proportional to each other under this circumstance, and as shown in FIG. 6, the increase of the image density is slow in the region where the adhering toner amount is relatively great.

FIGS. 7A and 7B are drawings which show the relationship between an input tone level, an adhering toner amount and an image density. In the event that color-converted CMYK tone data as they directly are without any data processing are used to form an image, the adhering toner amount (solid line) is approximately proportional to the input tone level, whereas the image density (dashed line) tends to saturate in a high-tone-levels region as shown in FIG. 7A. When an image is formed considering this through data processing so that the image density will be approximately proportional to the input tone level, the adhering toner amount significantly increases in the high-tone-levels region as shown in FIG. 7B. In other words, there is a non-linear correlation (second correlation) as denoted at the dashed line in FIG. 7B between the CMYK tone data as they are right after color conversion and the amount corresponding of toner which is consumed for image formation.

What is needed for calculation of a toner consumption amount based on color-converted tone data is the correlation between the tone data and an adhering toner amount, namely, the second correlation denoted at the dashed line in FIG. 7B. That is, when a toner consumption amount is calculated based on the tone data and the second correlation, calculation of the toner consumption amount is precise. A description will now be given on the two embodiments with respect to the toner counter which calculates a toner consumption amount in accordance with this principle.

First Embodiment

The first embodiment of the toner counter according to the invention requires identifying the second correlation above from a known characteristic and integrating while correcting the value of a tone level expressed by CMYK tone data based on the second correlation. Being defined as a target correlation which the apparatus should attain, the correlation (first correlation) between input image data and an actual image density on the sheet S is of course known. Meanwhile, since the correlation (third correlation) between an adhering toner amount and an image density is determined primarily by the physical properties of toner, it is possible to identify this correlation in advance as for toner to use. The correlation (first correlation) between the image data and the actual image density is an integrated characteristic of the correlation (second correlation) between the image data and the adhering toner amount and the correlation (third correlation) between the adhering toner amount and the actual image density, and therefore, the second correlation is identified by subtracting the contribution of the known third correlation from the known first correlation (FIG. 5). Since the first correlation becomes different depending upon the type of a screen which the halftoning part 116 uses, it is necessary to define the second correlation as well for each screen type.

FIGS. 8A and 8B are drawings for describing the principles on a method of determining the second correlation. Where a screen (denoted generally at the reference symbol "Scr-a" in FIGS. 8A and 8B) having a characteristic that an input tone level and an actual image density are almost proportional to each other as denoted at the solid line in FIG. 8A is used, the correlation (second correlation) which an adhering toner amount has in response to the input tone level has an increasingly steep gradient in a high-tone-levels region as denoted at the solid line in FIG. 8B for the purpose of compensating density saturation in the high-tone-levels region. On the contrary, where a screen (denoted generally at the reference symbol "Scr-b" in FIGS. 8A and 8B) enhancing a contrast as denoted at the dashed line in FIG. 8A is used, since the increase of the adhering toner amount is more abrupt in the high-tone-levels region, the second correlation is as denoted at the dashed line in FIG. 8B.

Figure 9:
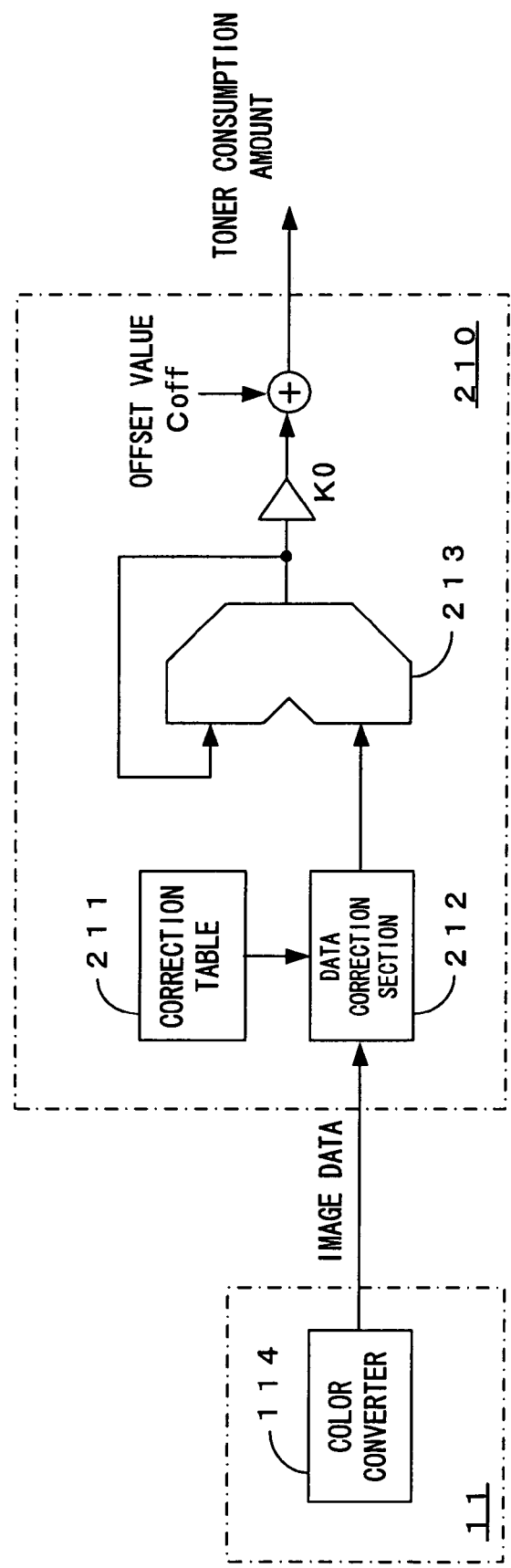
FIG. 9 is a drawing which shows the structure of the toner counter according to the first and the second embodiments.

FIG. 9 is a drawing which shows the structure of the toner counter according to the first and the second embodiments. Disposed in this toner counter 210 is a data correction section 212 which corrects tone data sent to the tone correction section 115 from the color conversion section 114 of the main controller 11 with reference to a correction table 211.

Figure 10:
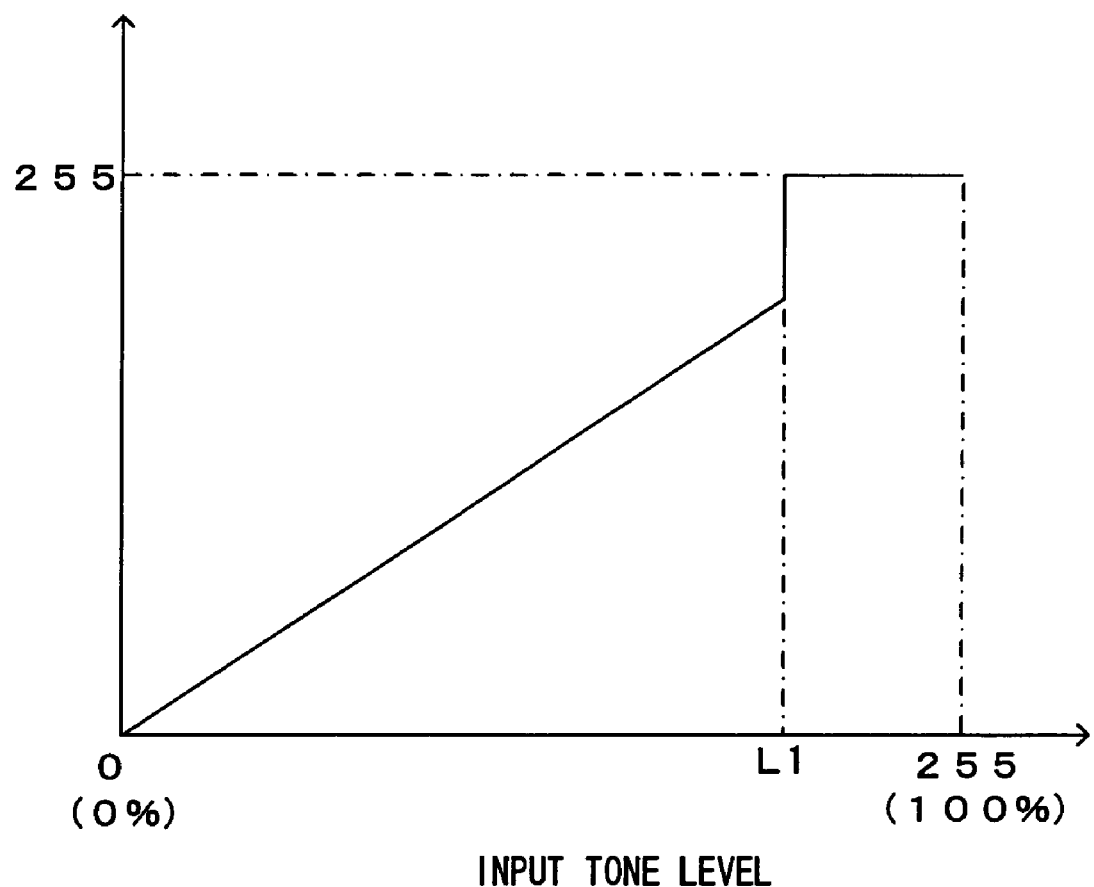
FIG. 10 is a drawing which shows a correction characteristic according to the correction table in the first embodiment.

FIG. 10 is a drawing which shows a correction characteristic according to the correction table in the first embodiment. The characteristic shown in FIG. 10 is stored in the form of a table within the correction table 211. This correction characteristic is nothing but simplification of the second correlation curve which is shown in FIG. 8B. In short, the characteristic shown in FIG. 8B that the adhering toner amount increases in the high-tone-levels region is approximated as a characteristic that an output proportional to an input is returned up until a certain input tone level L1 but a maximum value is returned in response to any input which is at or higher than that level. In response to any value expressed by tone data up to the level L1, the data correction section 212 outputs this value itself, but when receiving tone data at or beyond the level L1, the data correction section 212 corrects the data to a maximum value (255) and outputs the maximum value. That is, data at or over the level L1 are to be corrected. Where any value up to a certain value is output as it is but a constant value is output in response to a value which is equal to or beyond the certain value in this fashion, the structure of the table is simple and the memory resource is saved.

FIG. 11 is a drawing which shows the boundary of a correction range. The range for correction, namely, the level L1 is set for each toner color and each screen type as shown in FIG. 11. The level L1 is different for each toner color because the physical properties of toner are different between different colors and different types of screens are applicable for the different colors. The level L1 is different for each screen type because the correction table 211 is a simplified version of the second correlation and the second correlation is different between different screen types as shown in FIG. 8B.

The description of the toner counter 210 will be continued with reference back to FIG. 9. An accumulator 213 integrates values corrected by the data correction section 212. An integrated value integrated in a predetermined units (for one page for example) is multiplied by a predetermined coefficient KO which corresponds to an adhering toner amount per one tone level, thereby calculating the amount of toner which is consumed to form an image.

Further, an offset value Coff fed from the CPU 101 is added to the products of the integrated value stored in the accumulator 213 and the coefficient KO. The offset value Coff is a value corresponding to the amount of toner which is consumed without contributing to formation of the image which meets the input image data. The noncontributory toner may be toner which leaves the developing roller 44, adheres to the photosensitive member 22 and causes fogging, toner which is splashed inside the apparatus, toner which is consumed inside the apparatus during a controlling operation which aims at maintaining the capability of the apparatus, etc. Toner which is consumed to form various types of patch images in this embodiment is also noncontributory toner. Since the amount of toner which is consumed in such a manner is correlated with the operating time of the apparatus, the number of sheets on which images are formed, an operating condition for the apparatus, etc., a toner consumption amount during such a period is assumed based on these information controlled by the engine controller 10, and the assumed amount is used as the offset value Coff. The sum of this offset value and the toner consumption amount corresponding to the image data is used as the total toner consumption amount in the apparatus as a whole.

The CPU 101 disposed in the engine controller 10 manages thus calculated toner consumption amount, and saves the toner consumption amount in the RAM 107, the memory 91 or the like of each one of the developers 4Y, . . . , or the like depending upon the necessity. Further, it is possible to estimate the amount of toner remaining inside each developer from the calculated value of the toner consumption amount, which is useful for management of consumables for the apparatus as the display 12 may show a message demanding exchange of the developer when it is determined that the amount of toner remaining inside the developer has decreased down to or below a predetermined level.

As described above, the first embodiment of the toner counter according to the invention demands that the characteristic indicative of the correlation (second correlation) between color-converted image data and an adhering toner amount is identified in advance as a table from the correlation (first correlation) between image data and an actual image density and the correlation (third correlation) between an adhering toner amount and an actual image density, integration is executed while correcting the image data based on this table, and a toner consumption amount is calculated in accordance with the integrated value. Requiring integration while correcting the image data based on the correction table compiled for toner consumption amount calculation, this embodiment realizes accurate calculation of a toner consumption amount. In addition, as the correction regimen is changed for each toner color and screen, it is possible to calculate the toner consumption amount always accurately regardless of an image to form, the content of data processing, etc.

Although the correction table used in the embodiment above is the simplified relationship between color-converted image data and an adhering toner amount, the curve shown in FIG. 8B as it is may of course be used as the table.

Second Embodiment

The first embodiment regarding the toner counter described above is directed to compilation into a table of the second correlation identified in advance from a known characteristic and correction of color-converted image data with reference to this table, for the purpose of improving the accuracy of toner consumption amount calculation. Meanwhile, the second embodiment regarding the toner counter described below is directed to acquisition of the second correlation from detected densities of patch images and correction of image data based on thus acquired characteristic. The structure of the second embodiment regarding the toner counter is the same as that of the first embodiment described earlier (FIG. 9), except for the content of the correction table. The same structure as that of the first embodiment will therefore not be described again. The content of the correction table in the second embodiment will be mainly described below.

As described earlier, aiming at compensation of the gamma characteristic of the apparatus, this image forming apparatus forms a gradation patch image and detects its density. The correction table may be set utilizing this result. The gradation patch image is an image which is formed to span multiple tone levels. In addition, since the object is to obtain the "raw" gamma characteristic of the apparatus, image data corresponding to the gradation patch image is not treated by any special data processing. When an image is formed without any data processing, the density of the image has a characteristic which is integration of the gamma characteristic of the apparatus and the toner-amount/image-density characteristic as that shown in FIG. 7A which causes image density saturation in a high-tone-levels region.

Figure 12:
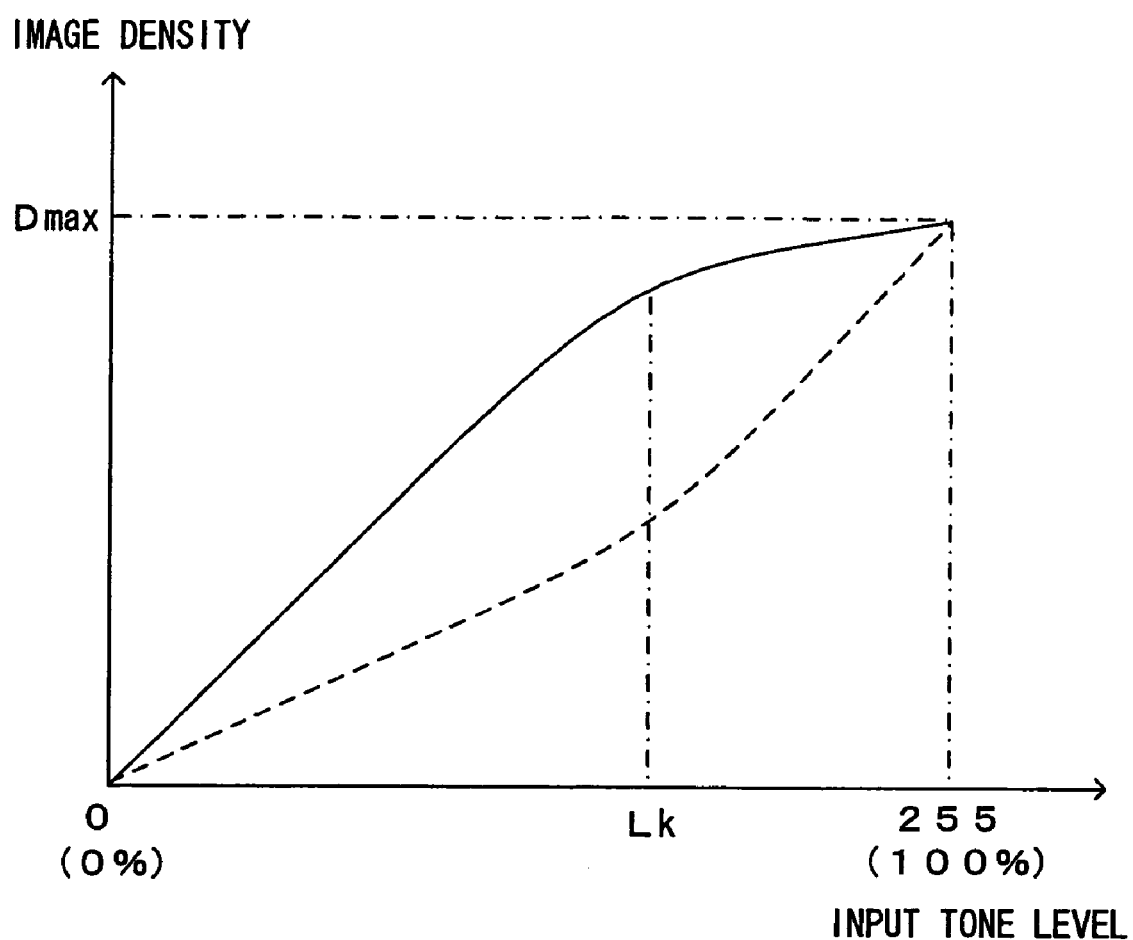
FIG. 12 is a drawing which shows an example of the density of a gradation patch image.

FIG. 12 is a drawing which shows an example of the density of a gradation patch image. Assuming that the detected density of a gradation patch image has a characteristic as that denoted at the solid line in FIG. 12 for instance, correction of providing the reverse characteristic denoted at the dashed line in advance ensures that the density of the corrected image has a linear relationship with respect to an original input tone level. The characteristic denoted at the dashed line corresponds to the relationship between an input tone level and an adhering toner amount shown in FIG. 7B, namely, the second correlation. The characteristic denoted at the dashed line in FIG. 12 further expresses the relationship between an input tone level before gamma correction and an output tone level after gamma correction. Hence, it is comparison of input data values to and output data values from the tone correction section 115 following updating of the tone correction table 118 based on the detected density of a gradation patch image that expresses the second correlation.

Figure 13:
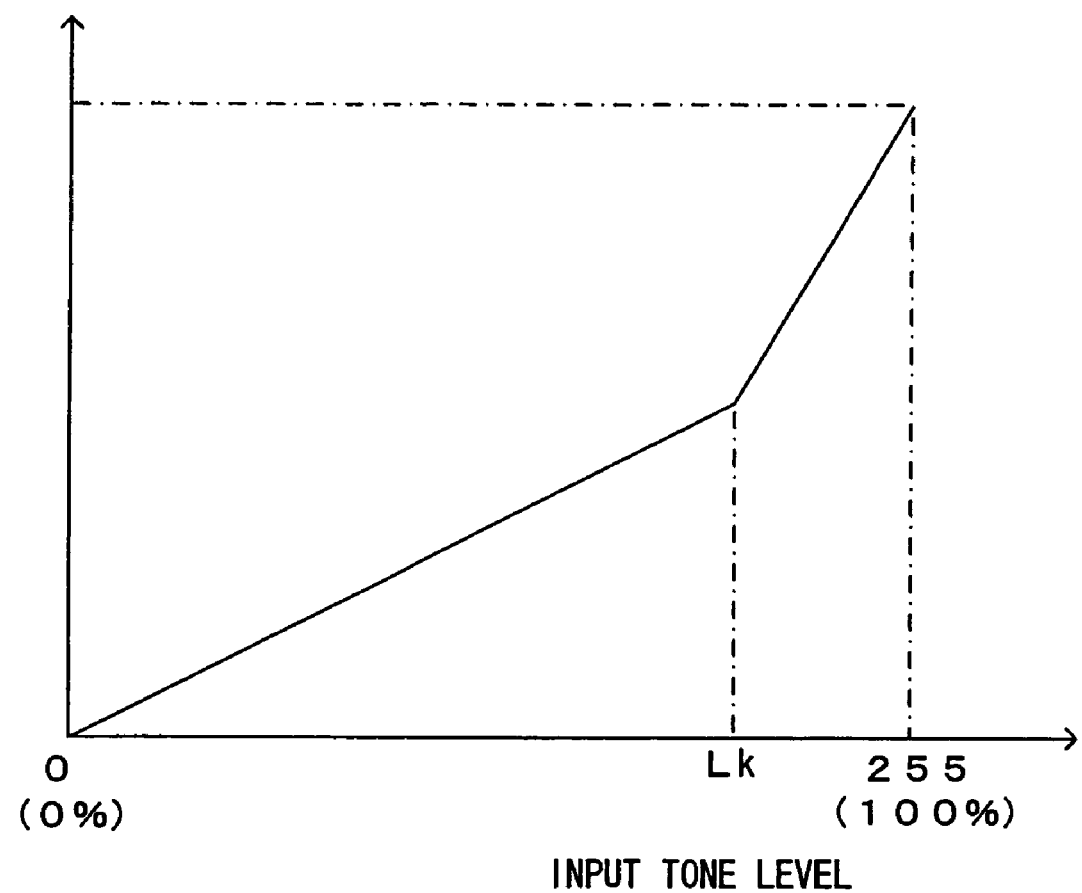
FIG. 13 is a drawing which shows a correction characteristic according to a correction table in the second embodiment.

FIG. 13 is a drawing which shows a correction characteristic according to a correction table in the second embodiment. The second correlation denoted at the dashed line in FIG. 12 is approximated as a broken line whose gradient changes in response to an input tone level Lk. This characteristic is stored as the correction table 211 (FIG. 9) and integration is executed while correcting image data in the data correction section 212, whereby a toner consumption amount is calculated accurately in the second embodiment as well like in the first embodiment described earlier.

The correction characteristic shown in FIG. 13 corresponds to the screen (Scr-a) denoted at the solid line in FIG. 8A which focuses mainly on middle shades. For the contrast-enhancing screen (Scr-b) denoted at the dashed line in FIG. 8A, a characteristic obtained by adding the characteristic shown in FIG. 13 to the characteristic denoted at the dashed line in FIG. 8A is used as the correction characteristic stored in the correction table 211.

Although the second correlation is approximated as a broken line having one inflection point in this embodiment, a correction characteristic expressed by a broken line having more than one inflection points or approximated by other functional curve may be used instead. Alternatively, an input tone level may be divided into a few segments and a step-wise correction characteristic may be realized.

As described above, in each one of the embodiments, the tone correction section 115 and the halftoning section 116 among other processing blocks of the main controller 11 serve as the "data processor" of the invention. The engine part EG functions as the "image forming unit" of the invention, while the intermediate transfer belt 71 and the density sensor 60 correspond to the "image carrier" and the "density detector", respectively, of the invention. Further, in each one of the embodiments above, the toner counter 210 functions as the "toner consumption amount calculator" of the invention. In addition, color-converted image data output from the color conversion section 114 correspond to the "input image data" of the invention and image data output from the halftoning section 116 correspond to the "output image data" of the invention in each one of the embodiments above.

The invention is not limited to the embodiment described above but may be modified in various manners in addition to the embodiment above, to the extent not deviating from the object of the invention. For instance, although each one of the embodiments above requires receiving RGB image data from a host computer, color-converting the same for toner colors (CMYK) and calculating a toner consumption amount based on the color-converted image data, image data without any color conversion may of course be used for toner consumption amount calculation when the image data which correspond to a toner color from the beginning are received, e.g., when image data corresponding to the black color alone are transmitted for monochrome image.

In addition, although each one of the embodiments above requires executing integration while correcting image data regardless of the content of an image to form for the purpose of toner consumption amount calculation, whether to perform correction may be determined depending upon the content of an image and correction may be carried out only when needed. When an image is formed with emphasis upon tone reproducibility so that an input tone level and an actual image density will be proportional to each other, proper gamma correction ensures an approximately linear relationship between an input tone level and an adhering toner amount as described above. In such an instance, it is expected that an error will not be significant very much even when an input tone level is integrated without any correction.

Outline of Third and Fourth Embodiments

The third and the fourth embodiments of an image forming apparatus implementing the toner counting technique according to the invention will now be described. Although the toner counter is generally denoted at the reference symbol 200 in FIG. 3, for distinction from other embodiments, the toner counter according to the third and the fourth embodiments will be hereinafter generally denoted at the reference symbol 230.

From an external apparatus such as a host computer, the image forming apparatus according to the third and the fourth embodiments receives, together with pixel information regarding a tone level at each pixel constituting an image to form, operation-related information which is for determining the mode of the image forming operation to execute. The image forming operation called for by the received operation-related information is carried out, and an image having a content corresponding to the pixel information is formed.

Third Embodiment

Figure 14:
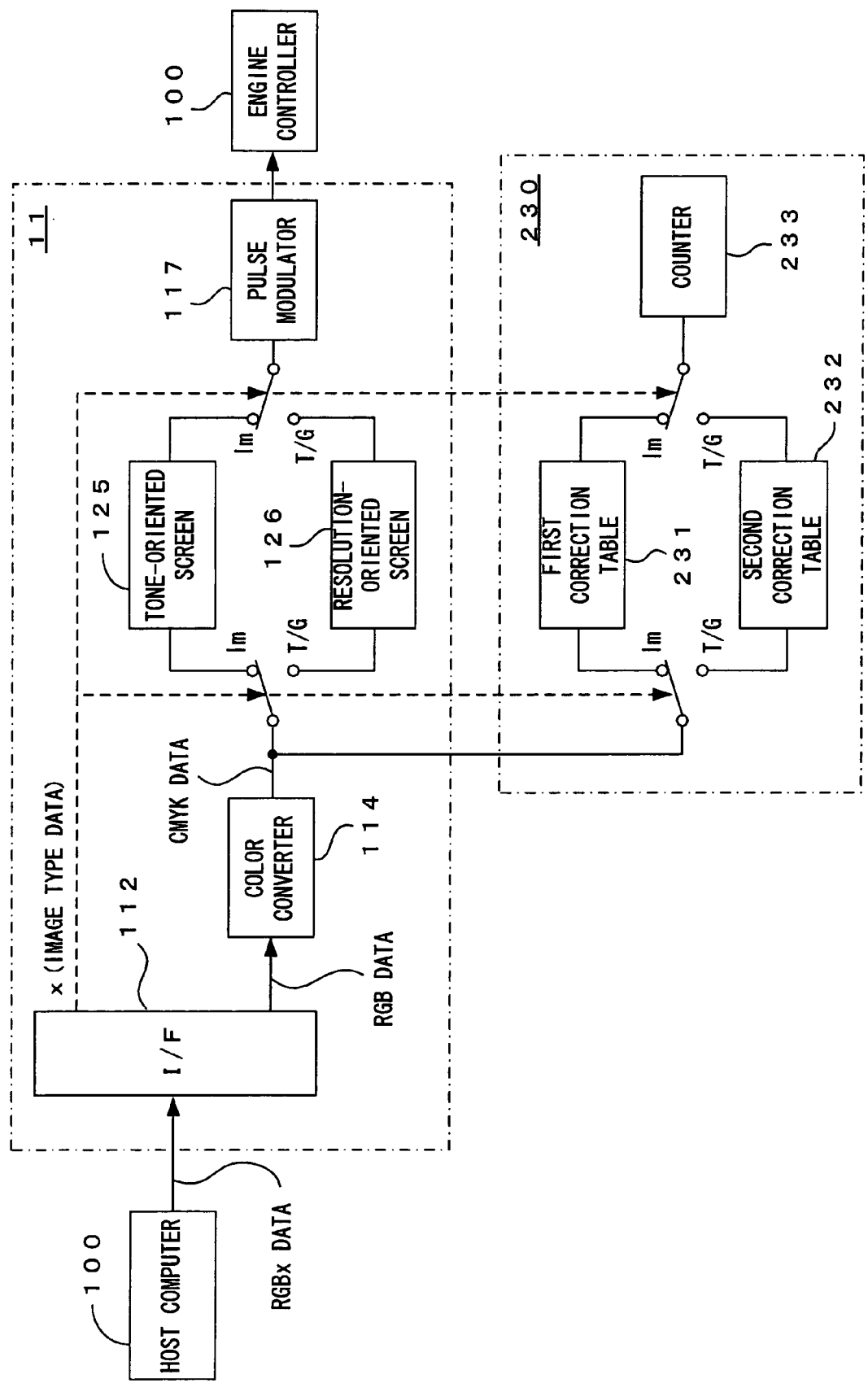
FIG. 14 is a block diagram which shows the content of data processing in the image forming apparatus according to the third embodiment.

FIG. 14 is a block diagram which shows the content of data processing in the image forming apparatus according to the third embodiment. This image forming apparatus receives, when necessary, an image formation command for instance from the host computer 100 which is capable of communicating with the apparatus on a local area network (LAN) line. The image formation command contains image data expressed in the three primary colors of red (R), green (G) and blue (B) and image type data (generally denoted at the reference symbol "x" in FIG. 14) which are indicative of the type of an image to form. These data are collectively indicated as "RGBx DATA" in FIG. 14. The description below assumes that there are three types of imaged to form, i.e., text images mainly comprised of a text (indicated as "T" in FIG. 14), graphic images such as line images and images which are drawn using graphics software (indicated as "G" in FIG. 14) and natural images such as photographs (indicated as "Im" in FIG. 14).

The image type data x may be set for each pixel constituting an image. In other words, RGBx data fed from the host computer 100 contain, for each pixel, information expressing the R, G and B shades at the pixel and information expressing which one of a text image, a graphic image and a natural image the pixel constitutes.

The interface (I/F) 112 receives the RGBx data transmitted from the host computer 100. Of this data, image data in the three primary colors of R, G and B (RGB data) are sent to the color conversion section 114 which is disposed inside the main controller 11. The color conversion section 114 converts the received RGB data into multi-level halftone pixel data (CMYK data) in toner colors (C, M, Y and K) which are used inside the apparatus. The CMYK data express, for the respective corresponding toner colors, tone levels at the respective pixels which constitute a desirable image. It is assumed here that each piece of pixel data is expressed by eight bits per color. That is, each pixel has either one of 256 tone levels between 0 and 255.

This is followed by screening of thus obtained CMYK data. This image forming apparatus is equipped with two processing screens, i.e., a tone-oriented screen 125 which is suitable to express smooth middle shades and a resolution-oriented screen 126 which enhances contrasts in an attempt to realize a high resolution. Either one of these is chosen in accordance with the content of the image type data x and used for screening. To be more specific, when the type of an image to form is a natural image (Im), the tone-oriented screen 125 is selected. When an image to form is a text image (T) or a graphic image (G), the resolution-oriented screen 126 is selected.

Each one of the processing screens 125 and 126 has the functions of both the tone correction section 115 and the halftoning section 116 described earlier. In other words, the processing characteristics of these processing screens 125 and 126 are integration of the characteristic which is for correcting the gamma characteristic of the apparatus and the characteristic which is for providing a predetermined tone expression characteristic to an image to form.

As described above, the image type data x are provided individually to the respective pixels, and therefore, it is possible to use different screens within one page of image for instance. In short, when a part of one page of image is a text image and other part is a natural image, the optimal processing screen may be chosen for each part. The image forming apparatus is thus capable of forming images in excellent qualities in the respective parts which are different image type sections of one page of image.

The content of screening is different depending upon the type of an image to form in the image forming apparatus according to the third embodiment described above, and therefore, the mode of the image forming operation to execute is different depending upon the type of an image to form. Execution of the image forming operation having a different processing content in accordance with the image type makes it possible to form various types of images in excellent qualities.

The pixel data in the C, M, Y and K colors screened in this fashion are fed to the pulse modulator 117, converted into pulse modulation signals to which the pixel image in the respective colors correspond, and sent to the exposure unit 6 via the laser driver 121 described earlier (FIG. 3).

The toner counter 230 according to the third embodiment comprises correction tables 231 and 232 which are used for performing predetermined correction of multi-level halftone pixel data in the respective colors output from the color conversion section 114 and a counter 233 which integrates corrected values. The two correction tables are used depending upon the image type data x. That is, when an image to form is a natural image (Im), the first correction table having a first correction characteristic is selected and input data are corrected based on this table. When an image to form is a text image (T) or a graphic image (G), the second correction table having a second correction characteristic which is different from the first correction characteristic is selected and input data are corrected based on this table.

Figure 15:
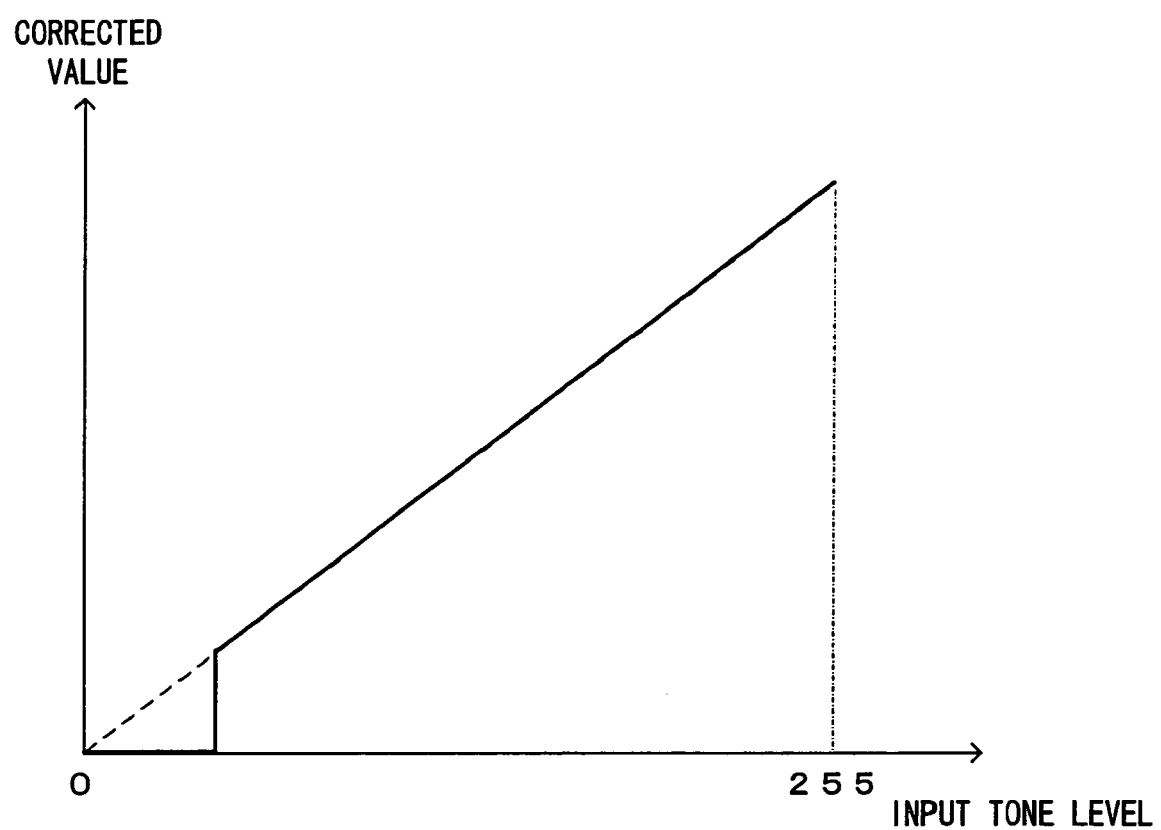
FIG. 15 is a drawing which shows a correction characteristic according to the first correction table.

FIG. 15 is a drawing which shows a correction characteristic according to the first correction table. When an image to form is a natural image, reproduction of middle shades is respected, and therefore, screening to perform is basically one which maintains an input tone level proportional to an output tone level. This however does not permit easy adhesion of toner to a highlight with a few tone levels. Considering these, the first correction table has the correction characteristic as that shown in FIG. 15. In other words, while use of the first correction table basically yields a corrected value which is proportional to an input tone level, in a region where an input tone level is close to zero, the corrected value is zero.

Figure 16:
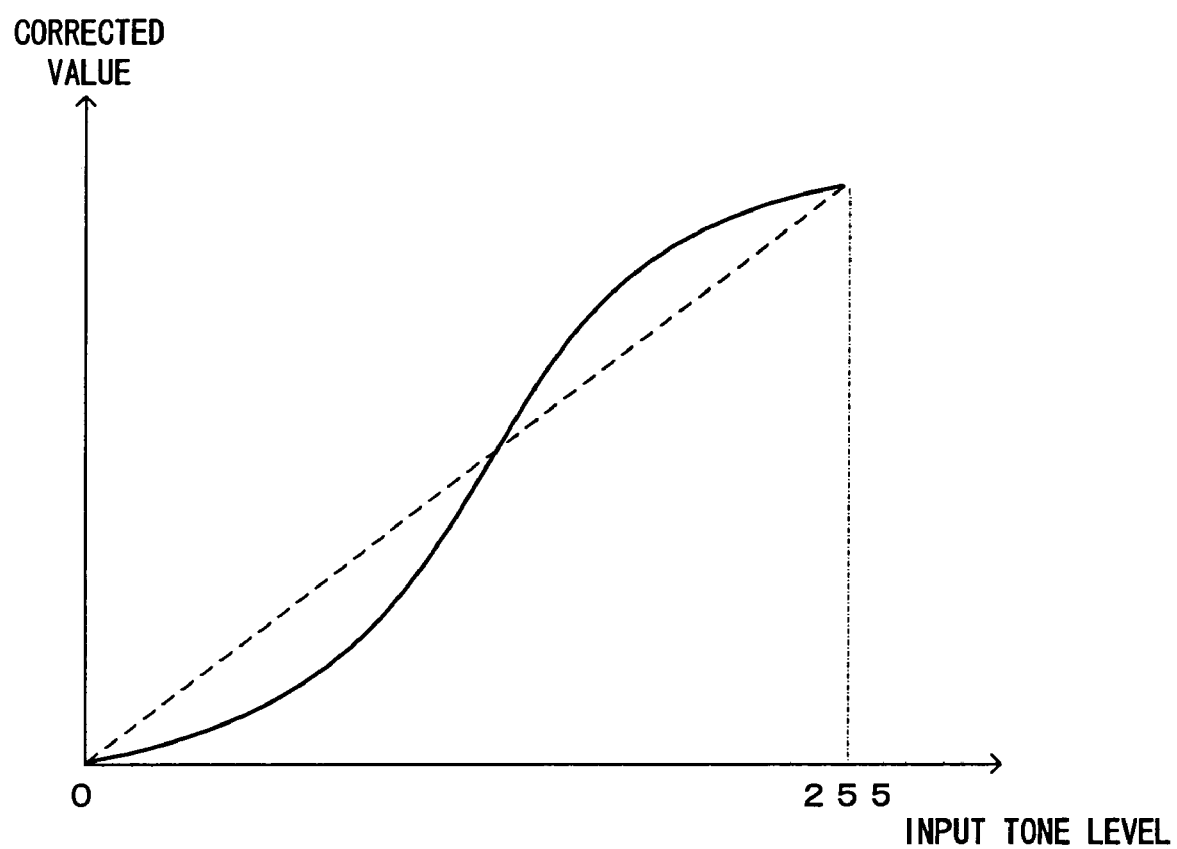
FIG. 16 is a drawing which shows a correction characteristic according to the second correction table.

FIG. 16 is a drawing which shows a correction characteristic according to the second correction table. When an image to form is a text image or a graphic image, it is contrasts of an image that is respected rather than reproduction of middle shades. This results in that the adhering toner amount at each pixel tends to be small when an input tone level is low but tends to be large when an input tone level is high. The correction characteristic according to the second correction table therefore is such a characteristic as shown in FIG. 16 that the less tone levels, the smaller value but the more tone levels, the larger value.

A corrected value in FIGS. 15 and 16 has a value and dimensions corresponding to an adhering toner amount at each pixel which has the associated input tone level. Further, since the relationship between input tone levels and corrected values is different between different toner colors, the two types of correction tables are provided for each toner color.

The counter 233 counts, for each toner color, thus obtained corrected values. In appropriate units, e.g., in the units of pages or jobs, a toner consumption amount during this unit period is calculated from the count. In this embodiment, the toner consumption amounts TC for the respective toner colors are calculated by the following formula:

$$TC = C\text{count} + C\text{off} \quad \text{(Equation 1)}$$

where the symbol Ccount denotes an integrated corrected value for this period which is integrated by the counter 203, whereas the symbol Coff denotes the same offset value as that described in relation to the first embodiment.

As described above, the image forming apparatus according to the third embodiment changes the content of processing of pixel data depending upon the image type data x fed from the host computer 100 and performs the image forming operation in the mode which is suitable to the image type. Describing in more specific details, the type of the processing screen to use for screening is selected in accordance with the type of an image which is expressed by the image type data. This apparatus is therefore capable of forming various types of images in excellent qualities. Further, for toner consumption amount calculation based on pixel data, the tone levels of the respective pixels are corrected with reference to the correction table chosen based on the image type data x, and a toner consumption amount is calculated from the integrated values of the corrected values. In this manner, it is possible according to the third embodiment to accurately calculate a toner consumption amount regardless of the type of an image to form.

Further, since each pixel bears information for determining the correction table to use for the pixel in this embodiment, the correction table to refer to is determined uniquely for each pixel. This allows execution of integration while serially correcting the tone levels of the respective pixels, i.e., calculation of corrected values with reference to the correction table for each pixel and simple addition of the correction values, for toner consumption amount calculation, which involves simple calculation. In contrast, where integration is executed without correction of the tone levels, it is not possible to take differences of the adhering toner amounts at the respective pixels into consideration during calculation, and therefore, it is difficult to improve the calculation accuracy through later correction. Another approach may be, for later correction, individual integration for the different screens. This approach however demands temporary storage of a great amount of data until calculation of a toner consumption amount and needs more memory resource.

The toner counter 230 may be realized by hardware as that shown in FIG. 14, or alternatively, by software. For example, the control program executed by the CPU 101 disposed inside the engine controller 10 may realize the function of the toner counter.

As described above, in this embodiment, the engine part EG and the toner counter 230 function as the "image forming unit" and the "toner consumption amount calculator" of the invention, respectively. Further, in this embodiment, the main controller 11 serves as the "data processor" and the "color conversion processor" of the invention, while the interface 112 disposed to the main controller 11 functions as the "receiver" of the invention. In addition, RGB data and image type data x transmitted from the host computer 100 to the image forming apparatus 1 correspond to the "pixel information" and the "operation-related information" of the invention, respectively, in this embodiment. Pixel data obtained by converting RGB data for the C, M, Y and K toner colors correspond to the "pixel-information-by-toner-color".

Further, in this embodiment, the correction tables 231 and 232 disposed in the toner counter 230 function as the "conversion table" and the "corrector" of the invention, and the counter 233 functions as the "integrator" of the invention.

Fourth Embodiment

The fourth embodiment with respect to the application of the image forming apparatus according to the invention will now be described. The image forming apparatus according to the fourth embodiment is an image forming apparatus according of the so-called host base type. As compared with the apparatus according to the third embodiment, the structure of the control unit in particular is simpler. That is, the image forming apparatus according to the fourth embodiment does not comprise a processing part which performs color conversion and screening. A host computer executes a primary part of data processing which is necessary to generate pixel data. Where the host computer executes the main data processing and the processing burden upon the image forming apparatus is accordingly reduced, it is not necessary to use a processor having an advanced processing capability within the image forming apparatus and it is therefore possible to reduce the size and the cost of the apparatus.

FIG. 17 is a block diagram which illustrates the fourth embodiment of the image forming apparatus according to the invention. Driver software 310 corresponding to this image forming apparatus runs inside a host computer 300 which is connected with the image forming apparatus 400 of the fourth embodiment. The driver software 310 receives image data created on application software 301 which may be word processor software, drawing software, image processing software or the like, and the driver software 310 treats the data through necessary data processing. Describing in more specific details, a color converter 314 converts RGB data output from the application software 301 into CMYK data. This is followed by screening of thus converted data using one of two processing screens prepared in advance (a tone-oriented screen 315 and a resolution-oriented screen 316) in accordance with image type data x output from the application software 301.

The screened data (which will be hereinafter indicated in the small letters as "cmyk" data for distinction from pre-screening CMYK data) and the image type data x are output to the image forming apparatus 400 via an interface 320. That is, an image formation command fed to the image forming apparatus 400 of the second embodiment contains pixel data (cmyk data) as they are after color conversion and screening and the image type data x.

An interface 412 of the image forming apparatus 400 receives the image formation command output from the host computer 300. The pixel data (cmyk data) corresponding to the C, M, Y and K colors contained in the command are sent to a PWM driver not shown. The pixel data for each color are corrected with reference to one of the two correction tables prepared in advance (a third correction table 401 and a fourth correction table 402) selected in accordance with image type data x, and integrated by a counter 403. A toner consumption amount for each color is calculated from the integrated value by the same calculation formula as that for the third embodiment (Equation 1).

The toner consumption amount calculation technique according to the invention thus does not need a big memory resource or an advanced calculation capacity, and therefore is favorably applicable even to an image forming apparatus according of the host base type which does not comprise a processor having an advanced calculation capability. An apparatus of the host base type to which the invention is applied can precisely calculate a toner consumption amount, like the apparatus according to the third embodiment described above.

By the way, in a system of the host base type as that shown in FIG. 17, a host computer may execute toner consumption amount calculation as well, to thereby further simplify the structure of the image forming apparatus. However, one host computer is not always connected with one image forming apparatus. Rather, the connection may be changed or more than one computers may use one image forming apparatus. Noting this, it is practical to have an image forming apparatus calculate a toner consumption amount as in this embodiment.

In the fourth embodiment, cmyk data (screened pixel data) sent from the host computer 300 to the image forming apparatus 400 correspond to the "pixel information" of the invention.

Although the third and the fourth embodiments described above requires referring the correction tables based on an input tone level to obtain a corrected value for each pixel, instead of this, the correction value may be calculated in accordance with an appropriate calculation formula for instance.

Further, in the third and the fourth embodiments described above, since the numerical values and the dimensions of corrected values stored in the correction tables are used as the adhering toner amounts at the respective pixels, mere integration of the corrected values attains calculation of the amount of toner which is consumed to form an image. An alternative to this is use of a table which stores quantitative deviations of an actual toner consumption amount from a linear line (denoted at the dashed lines in FIGS. 15 and 16) which assumes that an input tone level is proportional to a toner consumption amount. Further alternatively, values in a table to use as corrected values may be set so that a toner consumption amount will be a value obtained by multiplying the integrated value of corrected values by a predetermined proportional constant.

In addition, while the third and the fourth embodiments described above require switching the correction table in accordance with the type of an image to form, the correction tables may be distinguished in accordance with other information related to the mode of the image forming operation. For instance, between where a recording medium (the sheet S shown in FIG. 1) onto which an image formed by the engine part EG will be transferred transmits light as in the case of a transparent sheet and where the recording medium is opaque, it is desirable that the content of processing of image data is different to thereby deal with a difference in terms of hue reproduction. To deal with a different toner consumption amount attributable to the content of data processing, the method of calculating a toner consumption amount needs be changed depending upon the type of a recording medium. In light of this, a host computer may output an image formation command which contains, among others, information designating the type of a recording medium, and the mode of the image forming operation and the method of calculating a toner consumption amount may be changed in accordance with this information. In this manner, it is possible to form a quality image suitable to the type of a recording medium and accurately calculate a toner consumption amount.

Outline of Fifth and Sixth Embodiments

Through various experiments on the correlation between image data and a toner consumption amount, the inventor of the invention arrived at the following findings. That is, in this type of image forming apparatus, as the density of toner constituting an image (the amount of toner per unit surface area) reaches or exceeds a certain level, more toner will not increase the density of the image very much. Under this circumstance, the amount of toner constituting the image may not be uniquely determined even if the density of the image remains constant, which is one of causes which deteriorate the accuracy of toner consumption amount calculation according to conventional techniques which require processing image data considering only the density or quality of an image.

An image forming apparatus according to the fifth and the sixth embodiment described below therefore improves the content of data processing itself of image data fed from outside, thereby making it possible to uniquely determine the relationship between image data and a toner consumption amount. In this manner, both the quality of an image and the accuracy of toner consumption amount calculation are secured in these embodiments. Although the toner counter is generally denoted at the reference symbol 200 in FIG. 3, for distinction from other embodiments, the toner counter according to the fifth and the sixth embodiments will be hereinafter generally denoted at the reference symbol 250.

The image forming apparatus according to the fifth and the sixth embodiment performs density control processing described below at appropriate timing which may be for example immediately after power-on of the apparatus or restoration from sleeping, and maintains a stable image quality. During the density control processing, an operating condition for the engine part EG is optimized in accordance with the detected densities of patch images, and tone control processing described below is carried out under thus obtained optimal operating condition.

Fifth Embodiment

Figure 18:
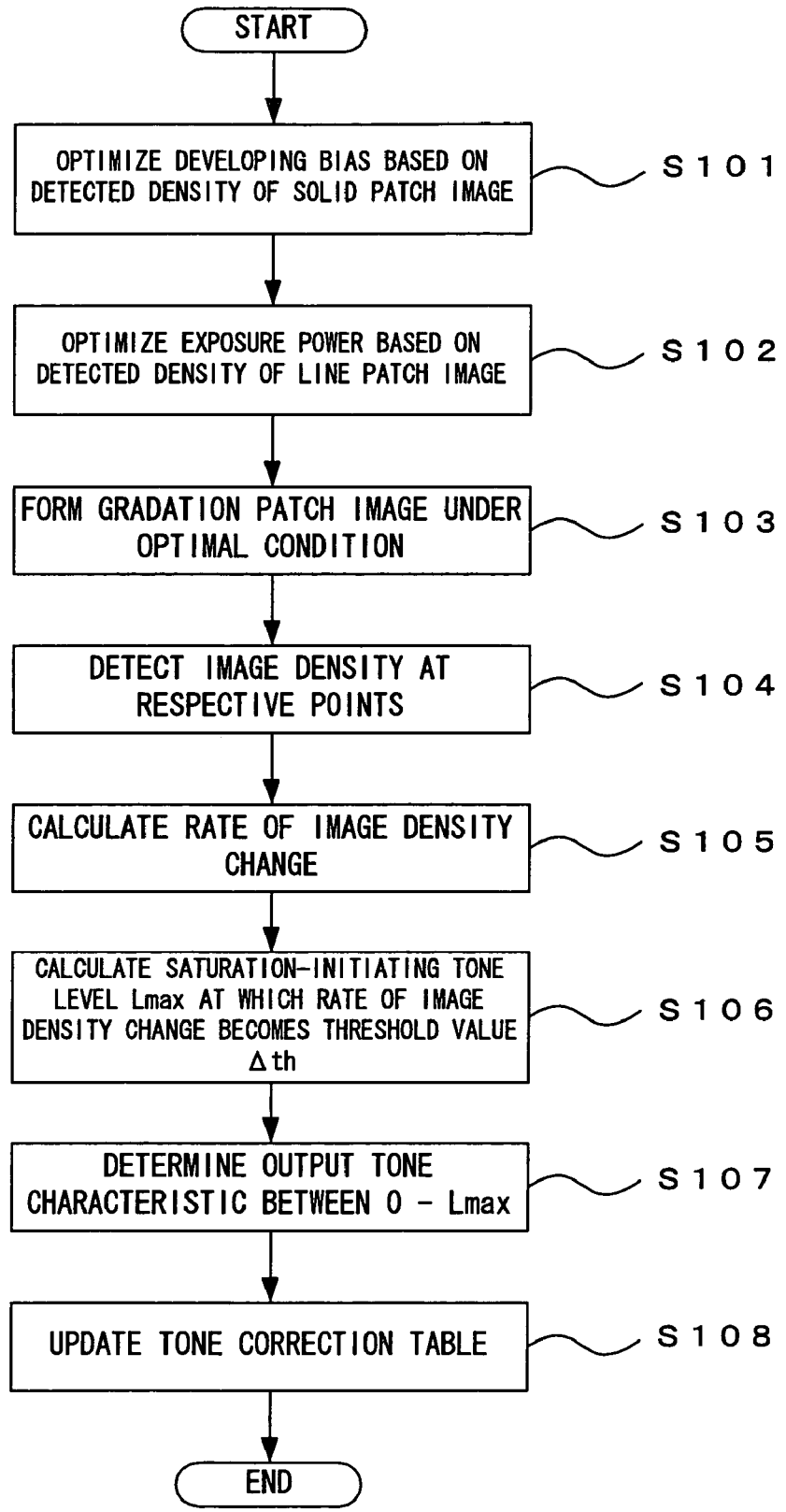
FIG. 18 is a flow chart which shows the density control processing according to the fifth embodiment.

FIG. 18 is a flow chart which shows the density control processing according to the fifth embodiment. During this processing, an operating condition for the engine part EG is optimized first. That is, while changing the developing bias applied upon the developing roller 44 over multiple levels, solid images serving as patch images are formed on the surface of the intermediate transfer belt 71 at the respective bias values, and based on the detected densities of the patch images, such an optimal developing bias value is calculated at which the density of a solid image will be a predetermined high-density side target density (Step S101). Following this, while changing the exposure power from the exposure unit 6 over multiple levels at thus calculated optimal developing bias, one-ON-ten-OFF line images for instance are formed as patch images at the respective exposure power levels, and based on the detected densities of the patch images, such an optimal value of the exposure power is calculated with which the density of a line image will be a predetermined low-density side target density (Step S102).

Known techniques (including the technique described in Japanese Unexamined Patent Application Publication No. 2003-215862 for example) may be used for the optimization of the operating condition for the engine part EG, a detailed description on this will not be provided here.

This is followed by execution of the tone control processing (Step S103 to Step S108) under the operating condition optimized in the manner described above. The principles of the tone control processing according to this embodiment will be described first.

Figure 19:
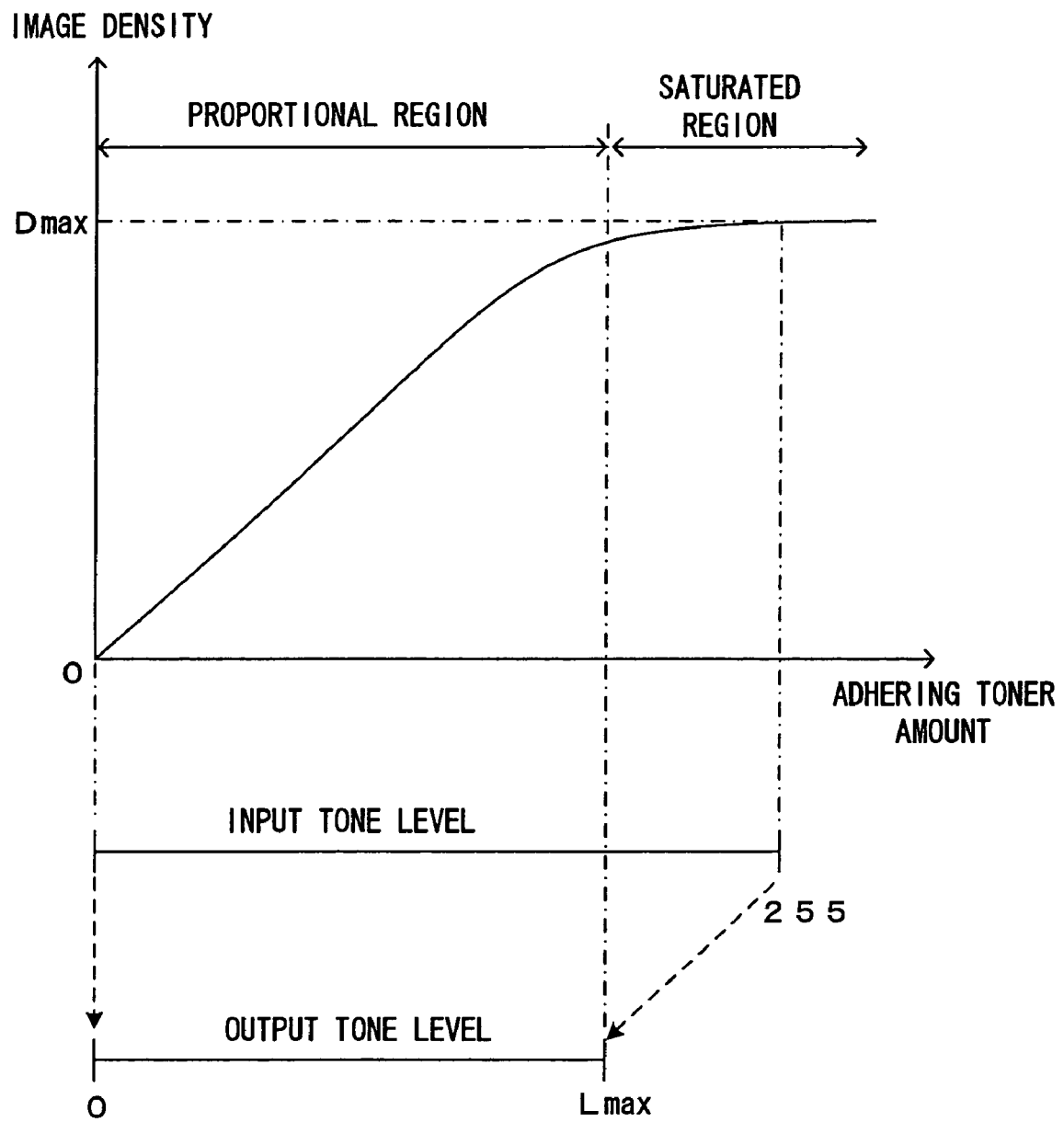
FIG. 19 is a drawing for describing the principles of the tone control processing according to the fifth embodiment.

FIG. 19 is a drawing for describing the principles of the tone control processing according to the fifth embodiment. In this type of image forming apparatus, while the density of an image generally increases in proportion to an increase of the amount of toner which adheres on the sheet S serving as a recording medium and constituting the image, as the adhering toner amount exceeds a certain level, the increase of the image density becomes sluggish and saturates in the end with almost no more changes. This is because when the surface of the sheet S is covered with toner, the image density in that area becomes almost equal to the hue of the toner, and even though the amount of toner further increases, the image density will not increase any more. As for the characteristic between an adhering toner amount and the density of an image (FIG. 19), a region in which the image density is approximately proportional to the adhering toner amount will be hereinafter referred to as the "proportional region" and a region in which the image density shows no great changes will be hereinafter referred to as the "saturated region".

It is assumed that a target density for a solid patch image (corresponding to 255 tone levels) is set at Step S101 to a value Dmax shown in FIG. 19. This setting is reasonable in that it will be possible to suppress a variation of the density of a solid image even despite a slight change of the adhering toner amount. When images with various tone levels are formed under an operating condition optimized with this setting, in an image whose tone level is equal to or lower than a certain tone level Lmax (hereinafter referred to as the "saturation-initiating tone level"), the tone level is approximately proportional to the density of the image. However, in an image whose tone level is equal to or higher than the saturation-initiating tone level Lmax, a change of the image density is extremely small and the one-to-one correspondence between the adhering toner amount and the image density is therefore lost. This means that the adhering toner amount may not always remain the same between two images having the same image density, in which case an error in toner consumption amount calculation will be great.

Noting this, during the tone control processing according to this embodiment, the tone correction table 118 is set such that the amplitude of change (0 to 255) of a tone level (input tone level) designated by an image signal which is fed will be replaced with the amplitude of change (0 to Lmax) with which the adhering toner amount will be in one-to-one correspondence with the image density and this amplitude of change will be output. In short, in this embodiment, while image data output from the color conversion section 114 are expressed with 0 to 255 tone levels, image data output from the tone correction section 115 are expressed with 0 to Lmax tone levels. That is, the tone correction section 115 performs scaling so that the tone level of the output image data will be the same or lower than the saturation-initiating tone level Lmax.

This makes it possible to form an image with excellent tone reproduction which is attained by maintaining the one-to-one relationship between a tone level of input image data and the density of an image, and in addition, to improve the accuracy of toner consumption amount calculation as a tone level and an adhering toner amount as well are maintained in a one-to-one relationship with each other. Execution of the tone control processing according to this embodiment thus permits forming an image while ensuring both a good image quality and a good accuracy of toner consumption amount calculation.

The specific content of the tone control processing will now be described with reference back to FIG. 18 again. First, a gradation patch image having the following image pattern is formed on the intermediate transfer belt 71 (Step S103).

Figure 20:
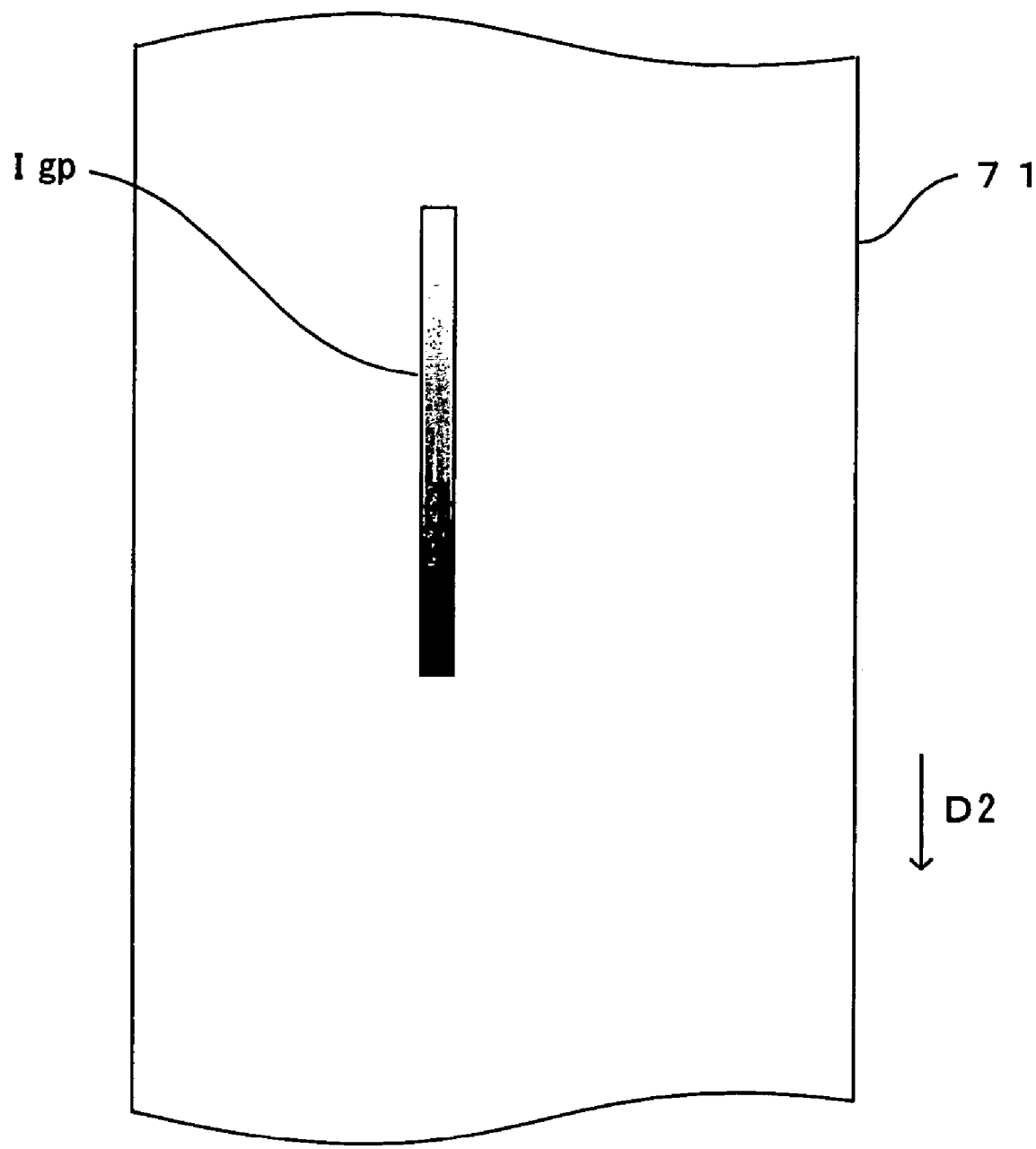
FIG. 20 is a drawing which shows a gradation patch image.

FIG. 20 is a drawing which shows a gradation patch image. The gradation patch image Igp formed on the intermediate transfer belt 71 is a stripe-like image which extends along the direction D2 in which the intermediate transfer belt 71 moves, the front edge of the gradation patch image Igp has a maximum tone scale level (255), and the gradation patch image Igp has gradation that the tone level decreases gradually toward the trailing edge. The image pattern of the gradation patch image is not limited to that shown in FIG. 20. The tone level may change stepwise for example. Further alternatively, such a patch image may be formed which is comprised of dispersed image fragments whose tone levels are different from each other.

The tone control processing will be described continuously with reference back to FIG. 18. The density sensor 60 detects the image density of the gradation patch image Igp formed in this manner, while changing the position of detection gradually (Step S104). Describing in more specific details, outputs from the density sensor 60 are sampled while the intermediate transfer belt 71 rotates, and the sensor outputs at the respective positions are correlated with tone levels of the patch image at the respective positions and stored.

This is followed by calculation of the saturation-initiating tone level Lmax which corresponds to the boundary between the proportional region and the saturated region shown in FIG. 19. At this stage, based on the following principles, the rate of change of the image density in response to a tone level is calculated from the detected densities of the gradation patch image Igp obtained earlier (Step S105), and a tone level at which the rate of density change becomes a predetermined threshold value Δth determined in advance is used as the saturation-initiating tone level Lmax (Step S106).

Figure 21:
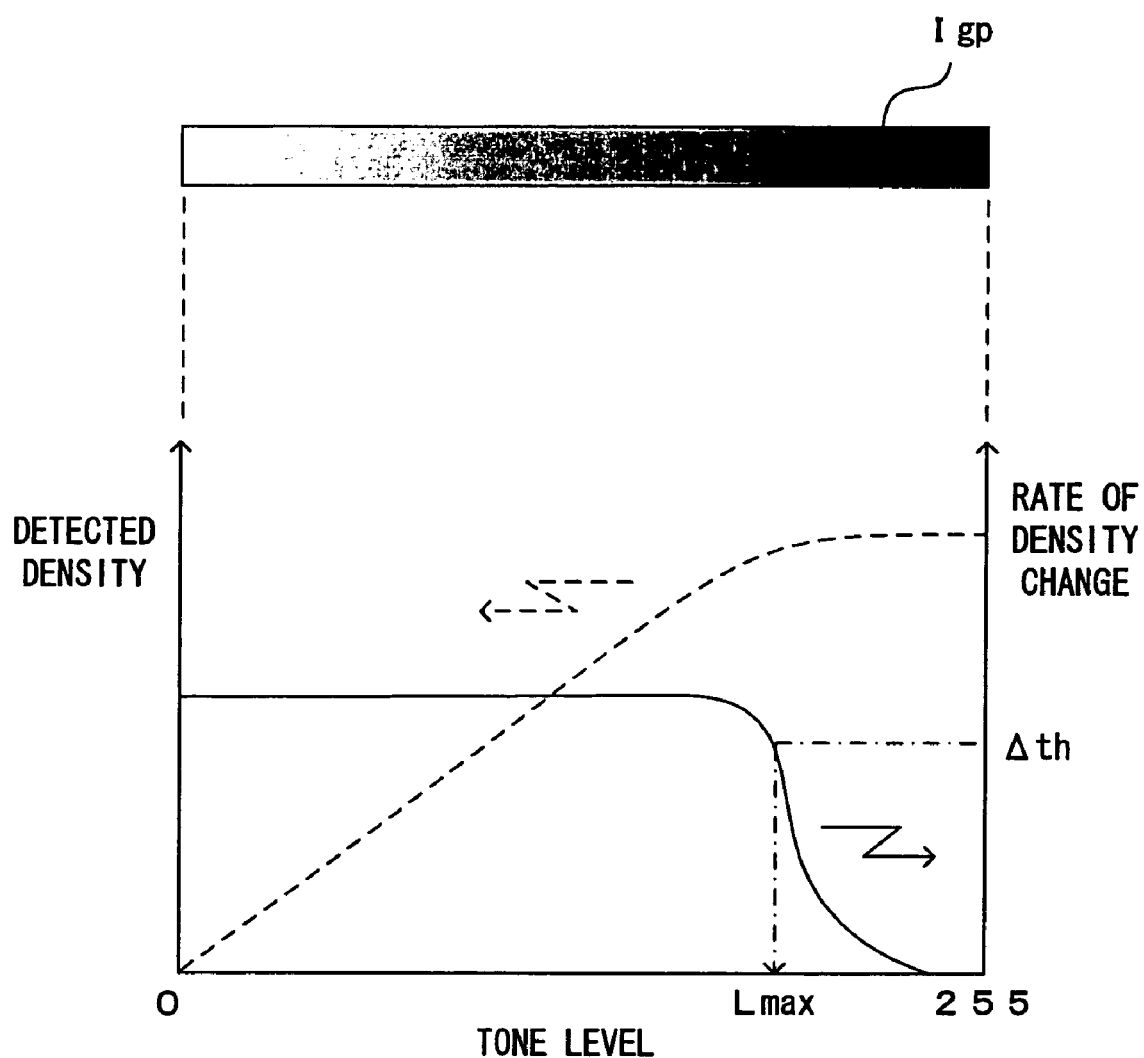
FIG. 21 is a drawing for describing a method of calculating the saturation-initiating tone level.

FIG. 21 is a drawing for describing a method of calculating the saturation-initiating tone level. Plotting of the detected densities of the gradation patch image Igp against a tone level shows that as denoted at the dashed line in the graph in a bottom section of FIG. 21, the patch image density increases as the tone level increases in a low-tone-levels region but starts to increase more slowly in a high-tone-levels region and becomes almost flat eventually. Plotting of the rate of density change during this against a tone level shows that the rate of density change is almost flat in the low-tone-levels region but abruptly decreases in the high-tone-levels region in correspondence with the slowdown of increase of the image density, as denoted at the solid line in the graph in the bottom section of FIG. 21.

The tone level at which the rate of density change abruptly decreases corresponds to the saturation-initiating tone level Lmax which expresses the shift from the proportional region to the saturated region shown in FIG. 19. Considering this, such a threshold value Δth is determined in advance at which the rate of density change corresponding to a tone level is smaller than a value in the flat section, and the tone level with which the rate of density change drops down to this threshold value Δth is defined as the saturation-initiating tone level Lmax.

The tone control processing will be described further continuously with reference back to FIG. 18. Once the saturation-initiating tone level Lmax is defined, the characteristic of an output tone level (output tone characteristic) in response to an input tone level is determined so that a maximum output tone level will become the saturation-initiating tone level Lmax as a result of scaling (Step S107), the content of the tone correction table 118 is updated in accordance of the result of this, and the tone control processing is terminated (Step S108).

Figure 22:
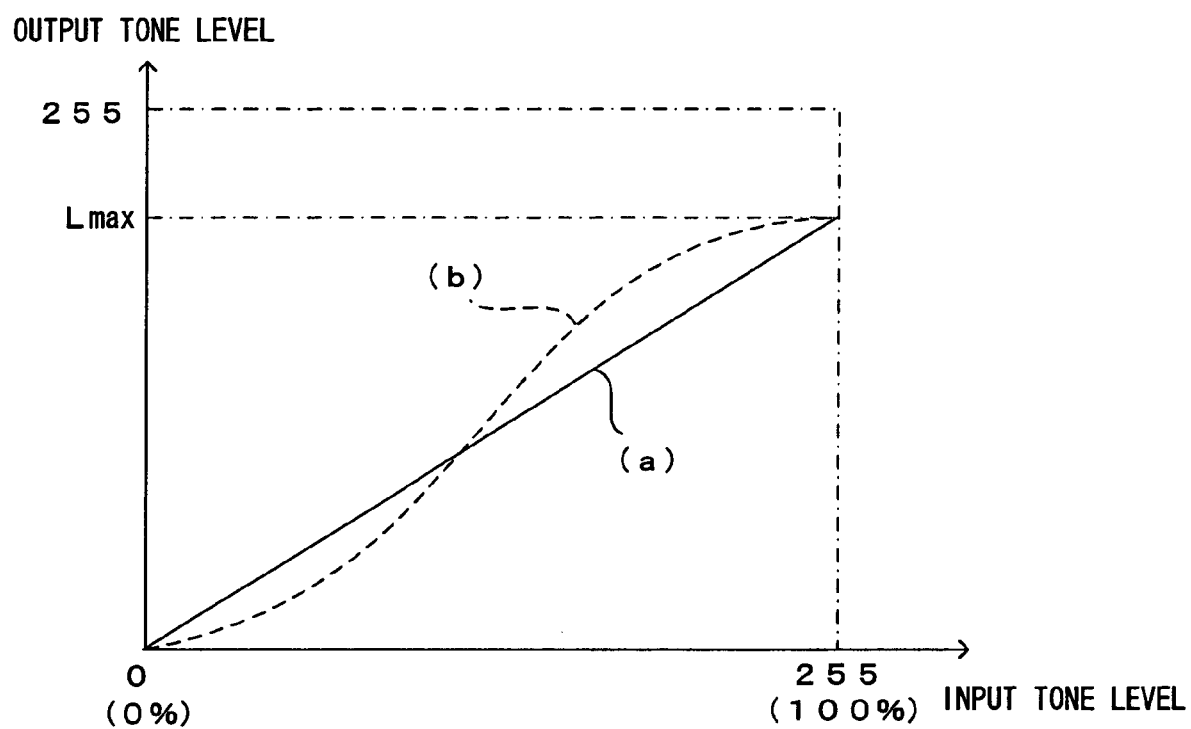
FIG. 22 is a drawing which shows an example of the output tone characteristic.

FIG. 22 is a drawing which shows an example of the output tone characteristic. In the event that the gamma characteristic of the engine part EG can be said approximately linear, the result of density detection in the low-tone-levels region as well is approximately linear as denoted at the dashed line in the graph in the bottom section of FIG. 21, and therefore, as denoted at the curve (a) in FIG. 22, an output tone level from the tone correction section 115 has a characteristic which is obtained by normalizing an input tone level (0 to 255) with the saturation-initiating tone level Lmax. On the contrary, if the gamma characteristic of the engine part EG is winding, the relationship between the tone level and the detected density shown in FIG. 21 as well will be winding. Outputs from the tone correction section 115 therefore have such a characteristic which cancels out the winding, e.g., the characteristic as that denoted at the curve (b) in FIG. 22.

As a result, as the tone correction section 115 processes the image data output from the color conversion section 114, the maximum value is regulated to the saturation-initiating tone level Lmax, provided with a characteristic which cancels out the gamma characteristic of the engine part EG, and then fed to the halftoning section 116. In this embodiment therefore, it is possible to form an image in an excellent quality without any influence of the gamma characteristic of the engine part EG. Further, since color-converted image data and an adhering toner amount are maintained in a one-to-one relationship with each other, use of the toner counter 200 described below realizes accurate calculation of a toner consumption amount.

Figure 23:
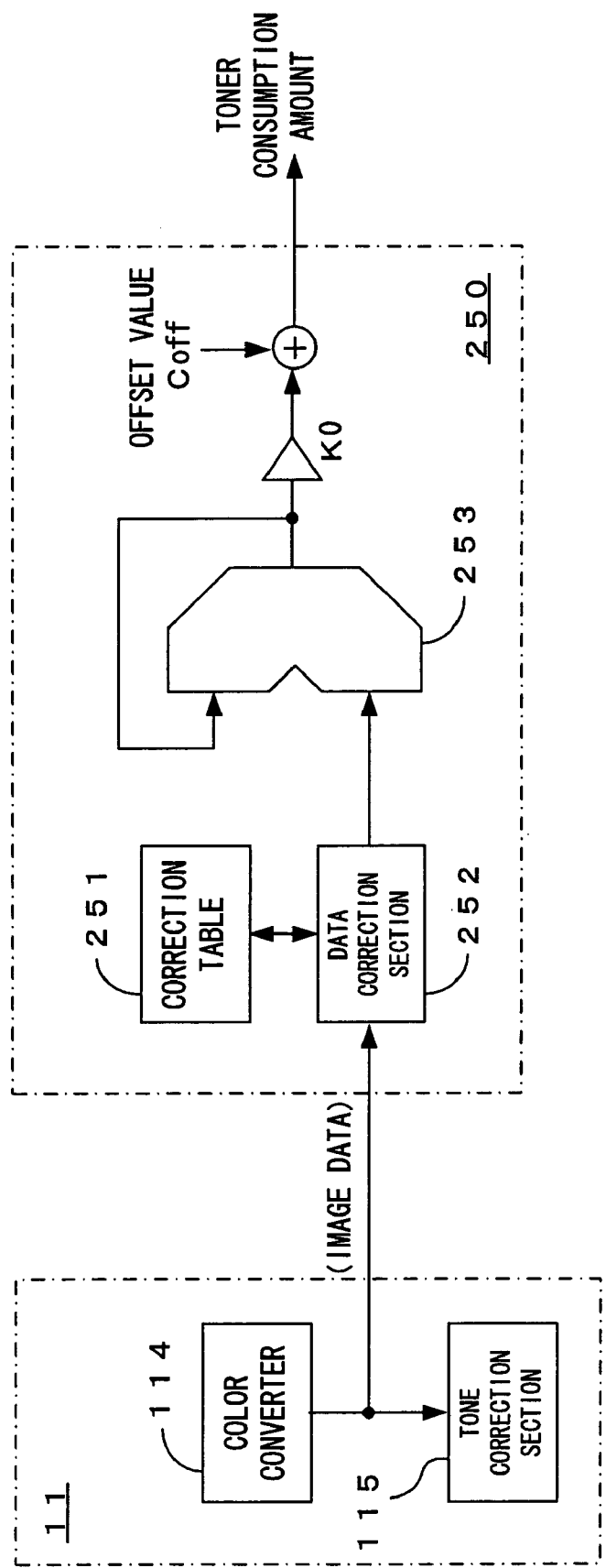
FIG. 23 is a drawing which shows the structure of the toner counter according to the fifth embodiment.

FIG. 23 is a drawing which shows the structure of the toner counter according to the fifth embodiment. This toner counter 250 receives image data which have been converted for the respective toner colors by the color conversion section 114 of the main controller 11, and calculates a toner consumption amount based on this image data. Describing in more specific details, the image data are fed to an accumulator 253 via a data correction section 252 which is accompanied with a correction table 251. The accumulator 253 integrates a tone level of data which are output from the data correction section 252 and outputs the integrated value for one page of image. In short, the accumulator 253 counts and integrates the corrected tone levels at the respective pixels which constitute the one page image.

The correction table 251 and the data correction section 252 are disposed considering different toner consumption amounts due to different processing screens which the halftoning section 116 uses.

Figure 24:
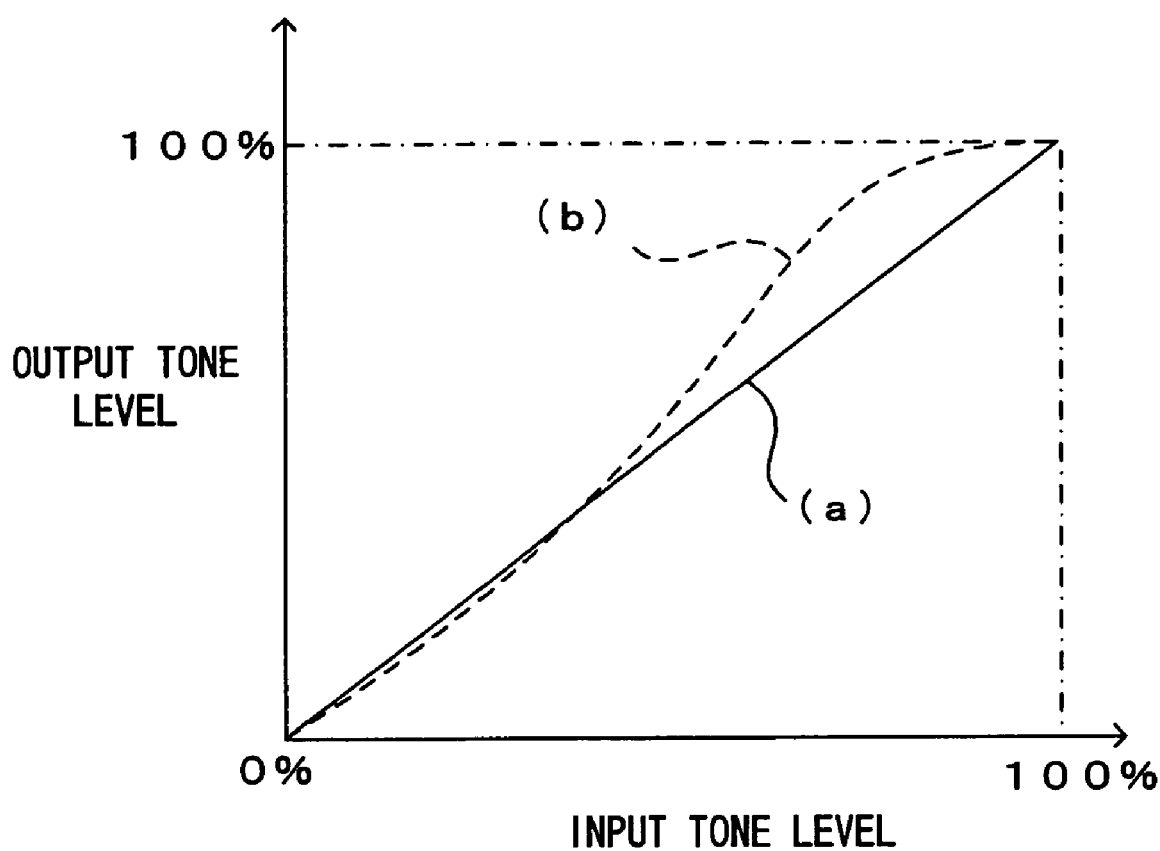
FIG. 24 is a drawing which shows different tone reproduction characteristics between different screen types.

FIG. 24 is a drawing which shows different tone reproduction characteristics between different screen types. While the halftoning section 116 screens the image data output from the tone correction section 115, the type of the screen which the halftoning section 116 uses is different depending upon the content of an image. In other words, since reproduction of middle shades is important when an image to form is a photograph, an illustration or the like, the halftoning section 116 uses such a screen (a tone-oriented screen) which makes the relationship between an input tone level and an output tone level approximately linear as denoted at the curve (a) in FIG. 24. In this case, a toner consumption amount is approximately proportional to an input tone level.

Meanwhile, for an image formed by a text, a chart and the like, a screen (a resolution-oriented screen) as denoted at the curve (b) in FIG. 24 is used which enhances image contrasts to put a priority upon a resolution. In consequence, use of the resolution-oriented screen denoted at the curve (b) in FIG. 24 tends to increase a toner consumption amount in a high-tone-levels region. In FIG. 24, "TONE LEVEL" of 100% is not the maximum value 255 among the 256 shades but the maximum value Lmax regulated by the tone correction section 115.

The tendency of toner consumption is thus slightly different depending upon the type of the screen to use. Noting this, this embodiment requires compiling the toner consumption tendency associated with each screen, namely, the characteristic curve shown in FIG. 24 into a table, saving the same in the correction table 252, and execution of integration while correcting image data in accordance with the type of the screen to use. That is, the image data fed to the data correction section 252 from the color conversion section 114 are corrected with reference to the correction table 251 chosen depending upon the screen type, and the accumulator 253 integrates the tone level expressed by thus corrected data. In this fashion, it is possible to more accurately calculate a toner consumption amount while considering different toner consumption amounts associated with the different screens. It is needless to mention that no particular correction of image data is necessary for toner consumption amount calculation where a screen having a linear tone reproduction characteristic as that denoted at the curve (a) in FIG. 24 is used.

The integrated value yielded by the accumulator 253 for one page of image is multiplied by a predetermined coefficient KO which corresponds to a toner adherence rate per tone level. The result is a value which corresponds to a toner consumption amount equivalent to one page of image. A predetermined offset value Coff is added to this value. The offset value Coff is the same as the offset value described earlier in relation to the respective preceding embodiments.

As described above, in the image forming apparatus according to the fifth embodiment of the invention, color-converted image data are processed based on the relationship between a tone level and an image density identified from the detected densities of the gradation patch image Igp, and an image corresponding the image data thus processed is formed. This data processing is scaling of an output tone level so that the output tone level will be equal to or lower than the saturation-initiating tone level Lmax at which an increase of the density of an image in response to a tone level will start saturating. In addition, such data processing is performed which provides a characteristic compensating the gamma characteristic of the engine part EG and any desired tone reproduction characteristic. It is therefore possible according to this embodiment to form a quality image which exhibits excellent tone reproduction. Further, execution of the density control processing at the proper timing makes it possible to stably form quality images.

In addition, since color-converted image data and an adhering toner amount are maintained in a one-to-one relationship with each other, it is possible to accurately calculate a toner consumption amount based on this relationship. According to this embodiment, it is possible to accurately calculate a toner consumption amount while securing an excellent image quality. Further, it is possible to solve the problem that even though images having the same image density are formed, nominal and actual toner decreases become significantly different depending upon the state of the apparatus or between two apparatuses.

Sixth Embodiment

The image forming apparatus according to the sixth embodiment of the invention will now be described. During the density control processing according to the fifth embodiment (FIG. 18) described above, the target density Dmax for a solid patch image for developing bias optimization is set within the saturated region (FIG. 19) in which the density of an image saturates in response to an adhering toner amount, an optimal developing bias value is calculated so that a solid patch image will have the density Dmax, and the content of data processing is set such that a maximum tone level will be scaled to the saturation-initiating tone level Lmax. Meanwhile, during the density control processing according to the sixth embodiment described below, an optimal developing bias value is calculated so that the density of a solid patch image will be located near the boundary between the proportional region and the saturated region shown in FIG. 19, and the content of data processing is set such that a maximum tone level will be 255.

Figure 25:
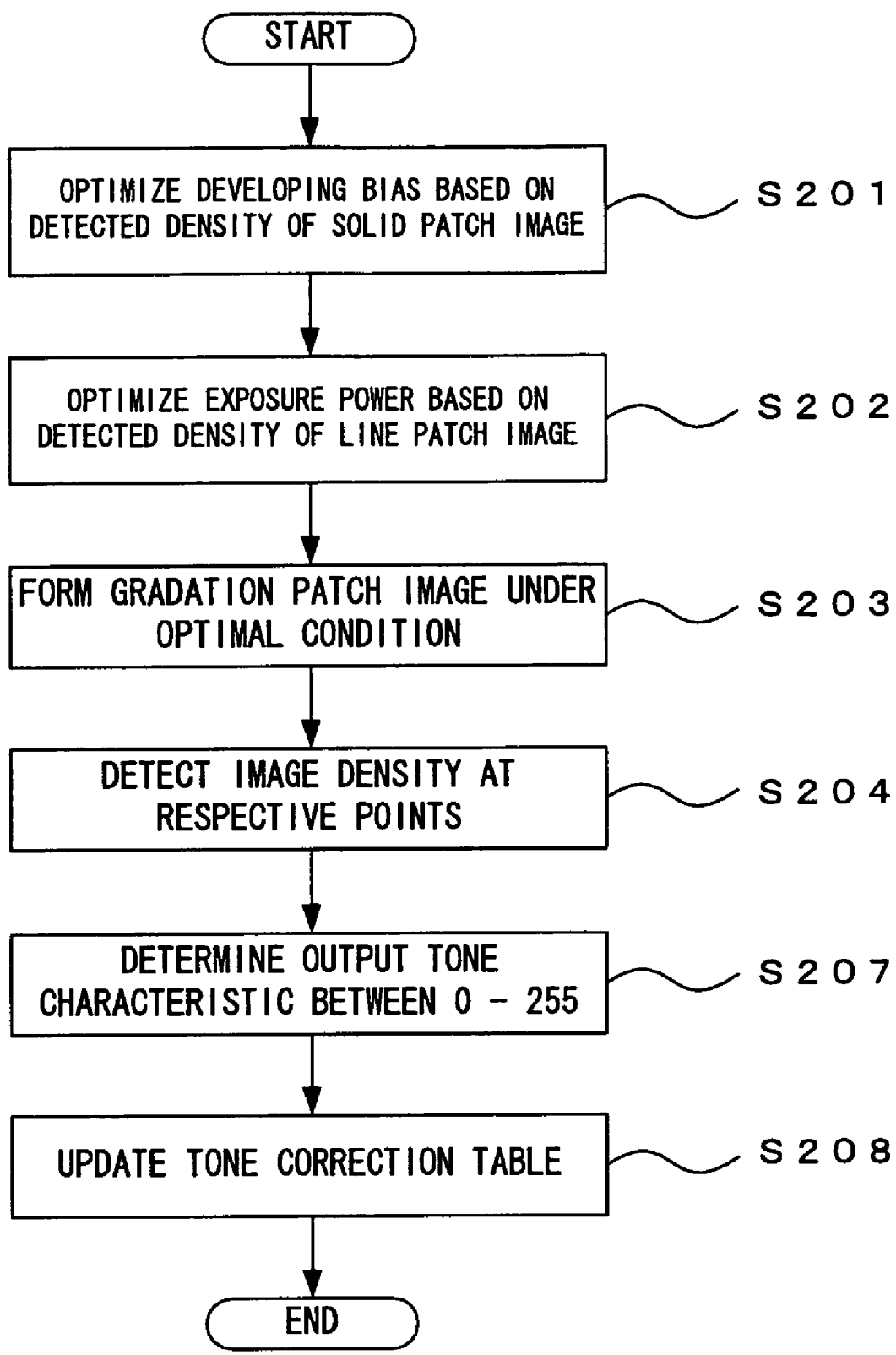
FIG. 25 is a flow chart which shows the density control processing according to the sixth embodiment.

FIG. 25 is a flow chart which shows the density control processing according to the sixth embodiment. While an optimal developing bias value is calculated first based on the detected densities of solid patch images (Step S201) during the density control processing according to the sixth embodiment as well, the method of calculation is different from the method according to the fifth embodiment.

Figure 26:
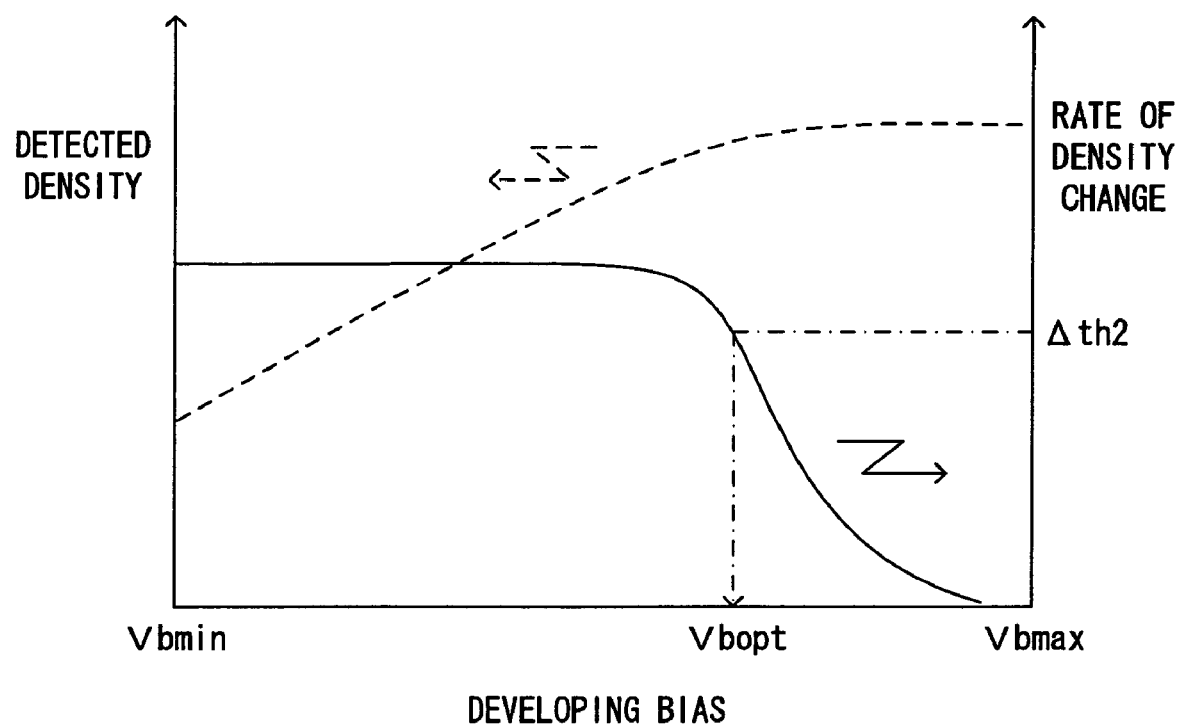
FIG. 26 is a drawing for describing a method of calculating an optimal developing bias.

FIG. 26 is a drawing for describing a method of calculating an optimal developing bias. While changing the developing bias within its variable range from a minimum value Vbmin to a maximum value Vbmax over multiple levels, solid patch images are formed at the respective bias values. Plotting of the detected densities of the solid patch images against the developing bias values shows that the density of a patch image increases as the developing bias increases but the increase of the image density gradually becomes sluggish as denoted at the dashed line in FIG. 26. This is because while an adhering toner amount increases as the developing bias increases, the increase of the image density saturates owing to the characteristic which is shown in FIG. 19.

Plotting of the rate of density change in this case that the rate of density change has a characteristic that it remains approximately constant initially but abruptly decreases near a certain bias value as denoted at the solid line in FIG. 26. The image density at this bias value is an image density which approximately corresponds to the boundary between the proportional region and the saturated region shown in FIG. 19. Since this image density is not very different from the target density Dmax, this developing bias value is used as the optimal developing bias. Describing in more specific details, as shown in FIG. 26, the value of the developing bias as it is when the rate of density change of a solid patch image at the developing bias is a predetermined threshold value $\Delta$th2 is used as the optimal developing bias Vbopt in this embodiment. This promises the following advantages.

Figure 27:
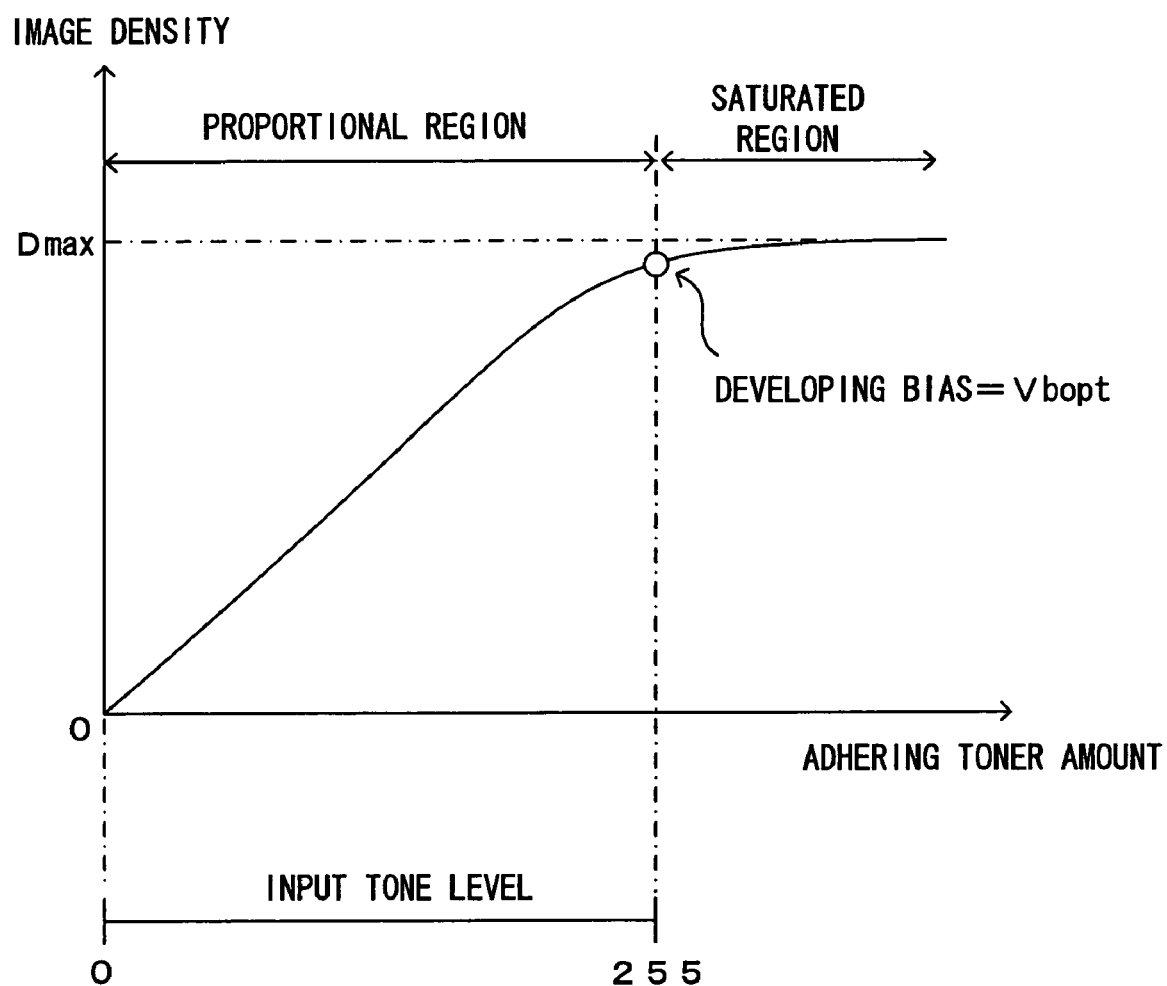
FIG. 27 is a drawing which shows the relationship between a tone level and an image density in the sixth embodiment.

FIG. 27 is a drawing which shows the relationship between a tone level and an image density in the sixth embodiment. In this embodiment, as the optimal developing bias Vbopt is set as described above, the density of a solid image, namely, an image corresponding to 255 tone levels is a value close to the target density Dmax, while an image having a lower tone level has a lower density. In short, the relationship between an adhering toner amount and the density of an image having any desired tone level from 0 to 255 comes in its entirety within the proportional region. Hence, without scaling of a tone level, each one of the relationship between a tone level and the density of an image and the relationship between a tone level and an adhering toner amount is already a one-to-one relationship. During the data processing at the tone correction section 115 and the halftoning section 116 therefore, it is possible to express the tone reproduction characteristic using the entire region spanning the 256 shades. This is convenient to widen the dynamic range of an image.

Referring back to FIG. 25 again, the density control processing according to the sixth embodiment will be described further After calculating the optimal developing bias in the manner above, the exposure power is optimized (Step S202). The content of the exposure power optimization is the same as that according to the fifth embodiment.

The tone control processing (Step S203 to Step S208) is then executed. The processing is the same as that according to the fifth embodiment until the stage that a gradation patch image is formed under the optimized operating condition identified in the fashion described above (Step S203) and the density of the gradation patch image is detected (Step S204). In this embodiment however, since it is not necessary to scale an output tone level, it is possible to define such an output tone characteristic which compensates the gamma characteristic of the engine part EG using the entire range from 0 to 255 (Step S207). The content of the tone correction table 118 is updated in accordance of the result of this, and the tone control processing is terminated (Step S208).

The structure according to the sixth embodiment may be similar to that according to the fifth embodiment described earlier except for these points.

As described above, in the image forming apparatus according to the sixth embodiment of the invention, the optimal developing bias is set to a value at which an increase of the density of an image in response to an adhering toner amount starts to saturate. This makes it unnecessary to perform scaling of a tone level of image data and ensures both a one-to-one relationship between a tone level and the density of an image and a one-to-one relationship between a tone level and an adhering toner amount, which in turn makes it possible to form a quality image and accurately calculate a toner consumption amount as in the apparatus according to the fifth embodiment.

The engine part EG functions as the "image forming unit" of the invention, in the fifth and the sixth embodiments as described above. Of the respective functional blocks of the main controller 11, the tone correction section 115 and the halftoning section 116 together as one unit function as the "data processor" of the invention. The engine controller 10 functions as the "controller" of the invention. Further, in these embodiments, the toner counter 200 functions as the "toner consumption amount calculator" of the invention. In addition, image data output from the color conversion section 114 correspond to the "input image data" of the invention and image data output from the halftoning section 116 correspond to the "output image data" of the invention in these embodiments.

While a combination of the independent functional blocks constitutes the main controller 11 in the fifth and the sixth embodiments as described above, it is not always necessary to clearly distinguish the respective functional blocks of the main controller 11 from each other as in the embodiments described above since data processing such as tone control processing and halftoning is in some cases performed as integrated processing, e.g., where the respective functional blocks are realized by software.

Further, although the fifth and the sixth embodiments as described above require receiving RGB image data from the host computer, color-converting the same for the toner colors (CMYK) and calculating a toner consumption amount based on the color-converted image data, image data without any color conversion may of course be used for image formation and toner consumption amount calculation when the image data which correspond to a toner color from the beginning are received, e.g., when image data corresponding to the black color alone are transmitted for monochrome image.

Further, although the embodiments described above require calculating a toner consumption amount for each one page of image, this is not limiting. A toner consumption amount may be calculated in the units of jobs or in the units of blocks which are obtained by subdividing one page for instance.

Further, the structure according to each embodiment is not limiting. The invention is applicable also to an apparatus which comprises a developer for black toner alone and forms a monochrome image, an apparatus which comprises other transfer medium (which may be a transfer drum, a transfer sheet, etc.) than an intermediate transfer belt, and other image forming apparatus which is equipped with a copier function, a facsimile function, etc.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus which forms an image using toner inside the apparatus, comprising:
   a data processor which performs predetermined data processing of multi-level halftone input image data corresponding to toner colors and generates multi-level halftone output image data;
   an image forming unit which forms an image which corresponds to the output image data; and
   a toner consumption amount calculator which calculates a toner consumption amount which is consumed for image formation based on the input image data,
   wherein the data processor performs the data processing so as to establish a predetermined correlation between the input image data and the output image data, and based on a preliminary identified relationship between a tone level and an image density within the image forming unit, scales a tone level of the output image data so that the tone level will be equal to or lower than a saturation-initiating tone level at which an image density increase in response to a tone level increases starts saturating.

2. An image forming apparatus according to claim 1, wherein the data processor generates the output image data whose tone level value is in proportion to a tone level of the input image data.

3. An image forming apparatus according to claim 1, wherein the toner consumption amount calculator integrates the tone level value of the input image data and calculates the toner consumption amount based on the integrated value.

4. An image forming apparatus according to claim 1, wherein the data processor generates the output image data which exhibit a predetermined tone reproduction characteristic in response to the tone level value of the input image data.

5. An image forming apparatus according to claim 4, wherein the toner consumption amount calculator corrects the tone level value of the input image data based on the tone reproduction characteristic and integrates the corrected value, and calculates the toner consumption amount based on the integrated value.

6. An image forming apparatus according to claim 1, wherein while changing the tone level over multiple levels, the image forming unit forms a patch image at thus varied tone level, and
   the data processor defines the saturation-initiating tone level based on a detected density of the patch image.

7. An image forming apparatus according to claim 6, wherein as the saturation-initiating tone level, the data processor uses a smallest value among tone levels which makes an increase of the density of the patch image in response to an increase of the tone level stay equal to or smaller than a predetermined threshold value.

8. An image forming apparatus which forms an image using toner inside the apparatus, comprising:
- a data processor which performs predetermined data processing of multi-level halftone input image data corresponding to toner colors and generates output image data;
- an image forming unit which forms an image which corresponds to the output image data; and
- a toner consumption amount calculator which calculates a toner consumption amount which is consumed for image formation based on a tone level of the input image data,
- wherein a data processing characteristic within the data processor is set so as to uniquely determine a toner consumption amount demanded by an image which is formed based on the output image data corresponding to the input image data, in response to the tone level of the input image data.

9. An image forming apparatus according to claim 8, wherein the data processing characteristic is set so that the toner consumption amount will be proportional to the tone level of the input image data, and
- the toner consumption amount calculator integrates the tone level value of the input image data and calculates the amount of toner which is consumed to form an image based on the integrated value.

10. An image forming apparatus according to claim 8, wherein the data processing characteristic within the data processor is set so that a predetermined correlation will be established between the tone level of the input image data and a density of an image which is formed based on the output image data corresponding to the input image data.

11. An image forming apparatus according to claim 10, wherein the data processing characteristic within the data processor provides the output image data with a characteristic which is for compensating a gamma characteristic of the image forming unit.

12. An image forming apparatus according to claim 8, wherein the data processing characteristic is set based on a detected density of a patch image which the image forming unit forms.

13. An image forming apparatus according to claim 12, further comprising a controller which optimizes an operating condition for the image forming unit so that a predetermined high-density patch image and a low-density patch image having a density lower than the high-density patch image will respectively have a high-density side target density and a low-density side target density lower than the high-density side target density,
- wherein under an operating condition optimized by the controller, while changing the tone level over multiple levels, the image forming unit forms a patch image at thus varied tone level, and
- the controller sets the data processing characteristic based on the detected density of the patch image.

14. An image forming apparatus according to claim 13, wherein the controller calculates, based on the detected density of the patch image, a saturation-initiating tone level at which an image density increase in response to a tone level increase starts saturating, and sets the data processing characteristic so that the tone level of the output image data will be scaled to or below the saturation-initiating tone level.

15. An image forming apparatus according to claim 14, wherein as the saturation-initiating tone level, the controller uses a smallest value among tone levels which makes an increase of the density of the patch image in response to a tone level increase stay equal to or smaller than a predetermined threshold value.

16. An image forming apparatus according to claim 13, wherein as an optimal operating condition for the image forming unit, the controller defines such a condition under which a one-to-one relationship will be established between the tone level of the patch image and the density of the patch image.

17. An image forming apparatus according to claim 16, wherein the image forming element comprises at least one developer in which toner is stored, and
- while changing a developing bias applied upon the developer over multiple levels, the controller forms at each bias value a solid image which will serve as the high-density patch image, detects the densities of the solid images, and uses as an optimal developing bias value such a value of the developing bias at which an image density increase in response to a developing bias increase starts saturating.

18. An image forming method, comprising:
- a data processing step of executing data processing of multi-level halftone input image data corresponding to toner colors and generating multi-level halftone output image data which are in a predetermined correlation with the input image data;
- an image forming step of forming an image which corresponds to the output image data using toner; and
- a toner consumption amount calculation step of calculating the amount of toner which is consumed for image formation based on the input image data,
- wherein at the data processing step, based on a relationship between a tone level and an image density identified in advance for the image forming step, a tone level of the output image data is scaled to or below a saturation-initiating tone level at which an image density increase in response to a tone level increase starts saturating.

19. An image forming method, comprising:
- a data processing step of executing predetermined data processing of multi-level halftone input image data corresponding to toner colors and generating output image data;
- an image forming step of forming an image which corresponds to the output image data using toner; and
- a toner consumption amount calculation step of integrating a tone level value of the input image data and calculating the amount of toner which is consumed to form an image based on the integrated value,
- wherein a data processing characteristic at the data processing step is set so as to uniquely determine a toner consumption amount demanded by an image which is formed based on the output image data corresponding to the input image data, in response to the tone level of the input image data.

* * * * *